US012683791B2

(12) United States Patent
Kiraz et al.

(10) Patent No.: US 12,683,791 B2
(45) Date of Patent: Jul. 14, 2026

(54) BLOCKING SENSITIVE DATA

(71) Applicant: NCHAIN LICENSING AG, Zug (CH)

(72) Inventors: Mehmet Sabir Kiraz, Leicester (GB);
Wai Liu, San Francisco, CA (US);
Owen Vaughan, London (GB)

(73) Assignee: nChain Licensing AG, Zug (CH)

( * ) Notice: Subject to any disclaimer, the term of this
patent is extended or adjusted under 35
U.S.C. 154(b) by 320 days.

(21) Appl. No.: 18/267,036

(22) PCT Filed: Dec. 22, 2021

(86) PCT No.: PCT/IB2021/062201
§ 371 (c)(1),
(2) Date: Jun. 13, 2023

(87) PCT Pub. No.: WO2022/137173
PCT Pub. Date: Jun. 30, 2022

(65) Prior Publication Data
US 2024/0064020 A1 Feb. 22, 2024

(30) Foreign Application Priority Data
Dec. 22, 2020 (GB) .................................... 2020414

(51) Int. Cl.
*H04L 9/32* (2006.01)
*H04L 9/00* (2022.01)
(52) U.S. Cl.
CPC .......... *H04L 9/3218* (2013.01); *H04L 9/3236*
(2013.01); *H04L 9/50* (2022.05)
(58) Field of Classification Search
CPC ....... H04L 9/3218; H04L 9/3236; H04L 9/50;
H04L 9/3239
See application file for complete search history.

(56) References Cited

U.S. PATENT DOCUMENTS

2011/0016524 A1* 1/2011 Guthery ................. G06F 21/33
726/22
2011/0131222 A1* 6/2011 DiCrescenzo ...... G06F 16/2465
707/E17.032

(Continued)

FOREIGN PATENT DOCUMENTS

EP 2378706 A1 * 10/2011 ........... H04L 9/3236

OTHER PUBLICATIONS

Lin Te-Yuan et al, "Zero-Knowledge Realization of Software-
Defined Gateway in Fog Computing", KSII Transactions on Internet
and Information Systems, Dec. 31, 2018, vol. 12, No. 12, URL:
https://www.koreascience.or.kr/article/JAKO201811459665323.
pdf, section 3; table 2.

(Continued)

*Primary Examiner* — Blake I Narramore
(74) *Attorney, Agent, or Firm* — Galvani Smith PLLC

(57) ABSTRACT

A method for blocking sensitive data in a message, the
method performed on a computing device and comprising:
creating a copy of said message; generating at least one zero
knowledge proof, the generating of each of said at least one
zero knowledge proof comprising: obtaining a mask bit
string which identifies locations of at least one sensitive bit
in bits of said copy; computing a public bit string by
modifying said bits of said copy by assigning the at least one
sensitive bit with a predetermined value; determining a
secret bit string which includes said at least one sensitive bit
and satisfies a requirement that said bits of said copy are
equal to an output of a bitwise logical calculation using the
public bit string, the mask bit string and the secret bit string;
hashing the copy of said message or a portion thereof to
generate an output hash value; and generating a zero knowl-
edge proof using the public bit string, the mask bit string, the
output hash value, the secret bit string; removing each of
said at least one sensitive bit from said copy to generate a (Continued)

modified message; and outputting the modified message to a recipient together with the at least one output hash value, and the at least one zero knowledge proof to enable the recipient to prove that the modified message is valid.

29 Claims, 14 Drawing Sheets

(56) References Cited

U.S. PATENT DOCUMENTS

| | | | | |
|---|---|---|---|---|
| 2017/0149796 | A1* | 5/2017 | Gvili | H04L 63/0428 |
| 2017/0277904 | A1* | 9/2017 | Adams | H04L 9/3218 |
| 2018/0159689 | A1* | 6/2018 | Keuffer | H04L 9/3221 |
| 2020/0302430 | A1* | 9/2020 | Pulsifer | H04L 9/3239 |
| 2020/0322132 | A1 | 10/2020 | Covaci et al. | |
| 2022/0078006 | A1* | 3/2022 | Krishnamurthy | H04L 9/3239 |
| 2022/0094675 | A1* | 3/2022 | Madisetti | H04L 9/14 |
| 2022/0278853 | A1* | 9/2022 | Ben-Reuven | H04L 63/123 |

OTHER PUBLICATIONS

GB2020414.5 Combined Search and Examination Report dated Sep. 30, 2021, 10 pages.
PCT/IB2021/062201, International Search Report and Written Opinion dated Mar. 25, 2022, 14 pages.

* cited by examiner

Transaction
from Alice to Bob

Validated by running: Locking
script from output 203 of $Tx_0$,
together with Alice's unlocking
script from input 202 of $Tx_1$. This
checks that Alice's unlocking script
in $Tx_1$ meets the condition(s)
defined in the locking script of
previous transaction $Tx_0$.

600

*RealContent – length L bits*

*RealContentPad – length 512n bits*

*Each RealContent$_i$ – length 512 bits*

*RealContentPublic*

702

$RealContent_1$ $RealContent_2$ $RealContent_3$ $RealContent_4$ $RealContent_5$ $RealContent_6$

704

704

000000

0000

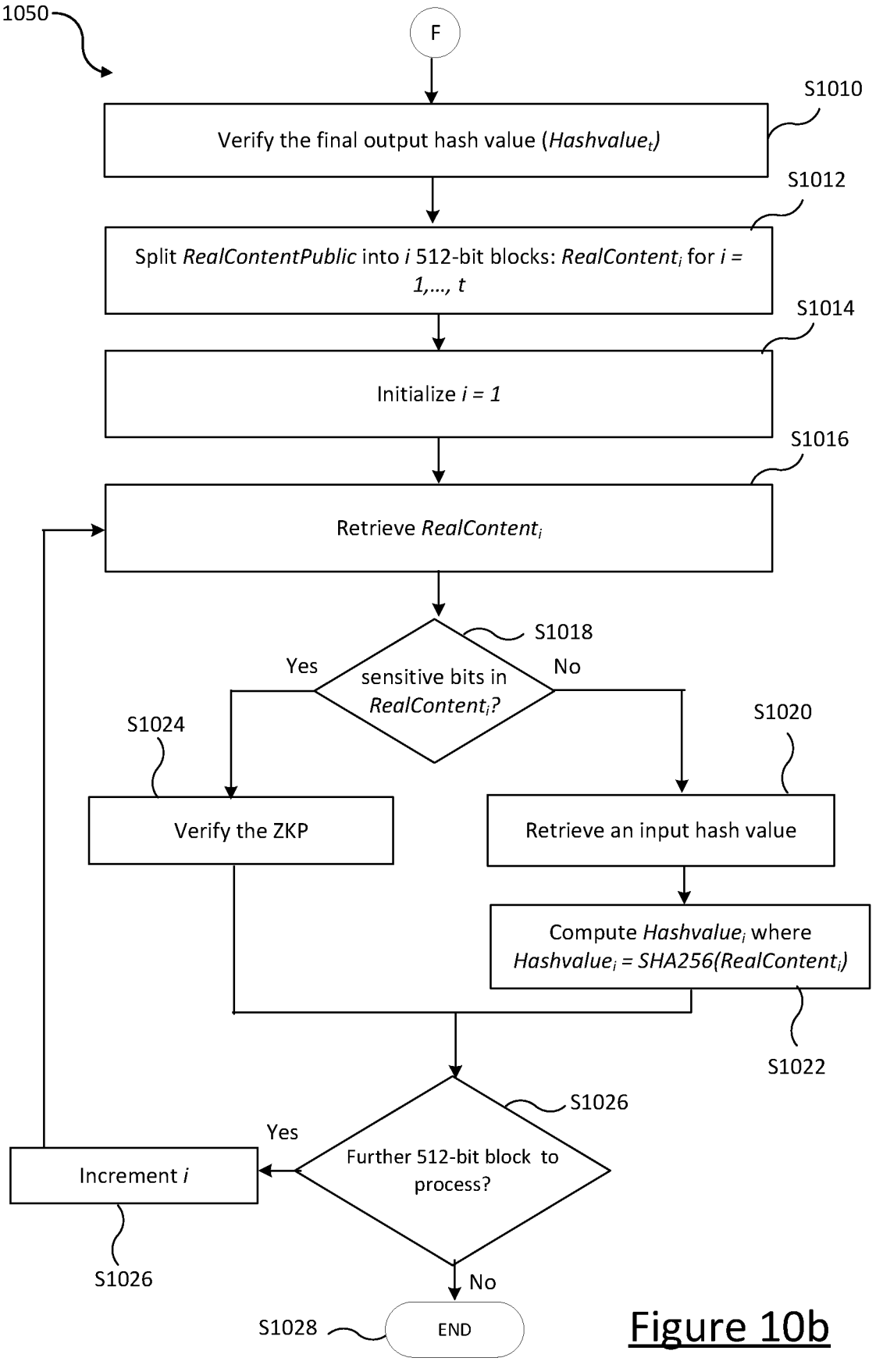

1050

F

Verify the final output hash value (*Hashvalue$_t$*) — S1010

Split *RealContentPublic* into *i* 512-bit blocks: *RealContent$_i$* for *i* = 1,..., t — S1012

Initialize *i = 1* — S1014

Retrieve *RealContent$_i$* — S1016 sensitive bits in *RealContent$_i$*? — S1018

Yes / No

Verify the ZKP — S1024

Retrieve an input hash value — S1020

Compute *Hashvalue$_i$* where *Hashvalue$_i$* = SHA256(*RealContent$_i$*) — S1022

Further 512-bit block to process? — S1026

Yes / No

Increment *i* — S1026

END — S1028

<u>Figure 10b</u>

BLOCKING SENSITIVE DATA

CROSS REFERENCE TO RELATED APPLICATIONS

This application is the U.S. National Stage of International Application No. PCT/1132021/062201 filed on Dec. 22, 2021, which claims the benefit of United Kingdom Patent Application No. 2020414.5, filed on Dec. 22, 2020, the contents of which are incorporated herein by reference in their entireties.

TECHNICAL FIELD

The present disclosure relates to blocking sensitive data in a message.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicized. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

It has been thought that the immutability of a blockchain (e.g. the bitcoin blockchain) means that any data will be un-censorable once uploaded to the public ledger. In a scenario where the distribution of some data payloads (e.g., bank account numbers, passport numbers) within bitcoin transaction(s) have been blocked by a governing authority, participants on the bitcoin network are left with a dilemma: either block the data from being propagated across the network or allow the same data to spread across the network. The first case will break the immutability of the blockchain while the latter could end up harming others and result in legal consequences for participants sharing the data.

In embodiments of the present disclosure there is provided a mechanism for blocking some data (as much or as little as required) in a blockchain transaction whilst maintaining the immutability of the blockchain. That is, despite the data being blocked, participants are still be able to verify the integrity of the blockchain's history.

Embodiments of the present disclosure can be used to block (i.e. conceal) sensitive data included in any part of any field of a blockchain transaction. For example, embodiments of the present disclosure can be used to block sensitive data included in the OP_FALSE OP_RETURN field of a blockchain transaction.

Zero-Knowledge Proofs (ZKPs) are a method by which a party, known as the prover, may prove to another party, known as the verifier, that a statement is true, without revealing any information beside the fact that the statement is true. In embodiments of the present disclosure, one or more ZKP are generated to provide proof that a modified message (with sensitive data removed) is still valid without revealing the sensitive data needed to prove the validity of the modified message. That is, the term 'zero-knowledge proof' is used herein to mean a proof of knowledge between a prover and a verifier for which no information about the sensitive/secret data is revealed. In the context of a blockchain transaction the ZKP is used to prove the statement "these fields are part of a transaction with a given transaction ID" but without giving away the information needed to prove the statement, namely the blocked data. Therefore, the validity of the modified blockchain transaction outputs may be verified without disclosing the blocked data.

According to one aspect disclosed herein, there is provided a method for blocking sensitive data in a message, the method performed on a computing device and comprising: creating a copy of said message; generating at least one zero knowledge proof, the generating of each of said at least one zero knowledge proof comprising: obtaining a mask bit string which identifies locations of at least one sensitive bit in bits of said copy; computing a public bit string by modifying said bits of said copy by assigning the at least one sensitive bit with a predetermined value; determining a secret bit string which includes said at least one sensitive bit and satisfies a requirement that said bits of said copy are equal to an output of a bitwise logical calculation using the public bit string, the mask bit string and the secret bit string; hashing the copy of said message or a portion thereof to generate an output hash value; and generating a zero knowledge proof using the public bit string, the mask bit string, the output hash value, the secret bit string; removing each of said at least one sensitive bit from said copy to generate a modified message; and outputting the modified message to a recipient together with the at least one output hash value, and the at least one zero knowledge proof to enable the recipient to prove that the modified message is valid.

According to one aspect disclosed herein, there is provided a method for verifying that a modified message is valid, the modified message corresponding to an original message with sensitive data removed therefrom, the method performed on a computing device and comprising: obtaining the modified message, wherein the modified message corresponds to said original message with each sensitive bit of the original message having been assigned a predetermined value; obtaining an output hash value of the modified message, and verifying the output hash value using data stored in memory of the computing device; receiving from a sender device at least one zero knowledge proof associated with bits of said modified message; verifying each of the at least one zero knowledge proofs using (i) knowledge of a bitwise logical calculation, or a verification key associated therewith, used by the sender device to derive a secret bit string used to generate said zero knowledge proof; (ii) the bits of said modified message; (iii) a mask bit string which identifies locations of at least one sensitive bit in the bits of said modified message; (iv) a hash value of the bits of said modified message or a portion thereof; and (v) an input hash value for the bits of said modified message.

Whilst embodiments are described herein with reference to the message being a blockchain transaction, embodiments of the present disclosure extend outside the context of bitcoin and other blockchains and may be used to block any part of any message of any length. As explained below, embodiments can efficiently block parts of large data size messages by way of concurrent execution (i.e. computation in parallel).

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
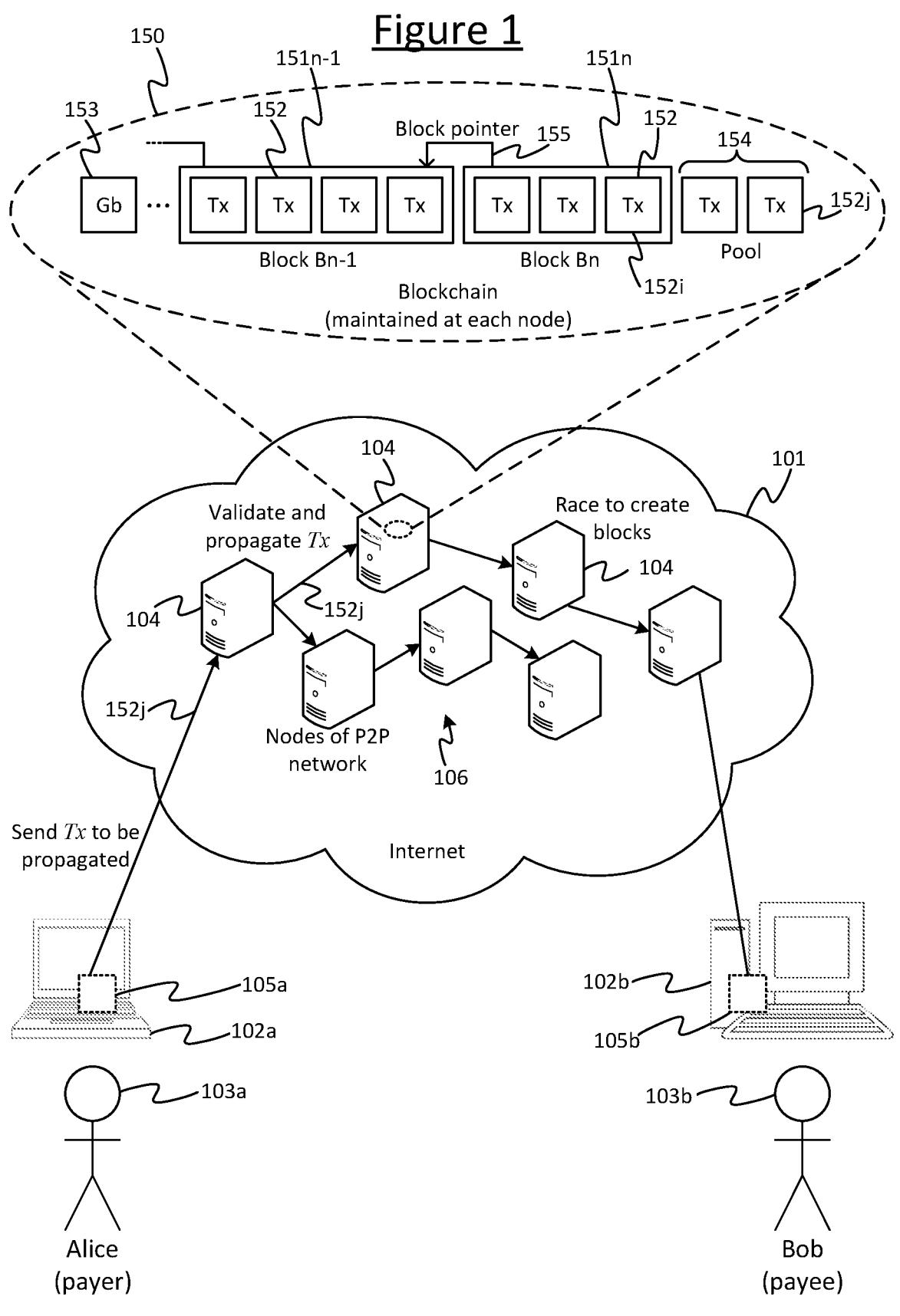
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool".

This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152_j_, the (or each) input comprises a pointer referencing the output of a preceding transaction 152_i_ in the sequence of transactions, specifying that this output is to be redeemed or "spent" in the present transaction 152_j_. In general, the preceding transaction could be any transaction in the ordered set 154 or any block 151. The preceding transaction 152_i_ need not necessarily exist at the time the present transaction 152_j_ is created or even sent to the network 106, though the preceding transaction 152_i_ will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152_i_, 152_j_ be created or sent out-of-order (see discussion below on orphan transactions). The preceding transaction 152_i_ could equally be called the antecedent or predecessor transaction.

The input of the present transaction 152_j_ also comprises the input authorisation, for example the signature of the user 103_a_ to whom the output of the preceding transaction 152_i_ is locked. In turn, the output of the present transaction 152_j_ can be cryptographically locked to a new user or entity 103_b_. The present transaction 152_j_ can thus transfer the amount defined in the input of the preceding transaction 152_i_ to the new user or entity 103_b_ as defined in the output of the present transaction 152_j_. In some cases a transaction 152 may have multiple outputs to split the input amount between multiple users or entities (one of whom could be the original user or entity 103_a_ in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152_j_ (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152_j_ could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152_j_ matches the expected signature, which depends on the previous transaction 152_i_ in an ordered sequence of transactions 152. In such an output-based transaction protocol, this may comprise checking that the cryptographic signature or other authorisation of the party 103 included in the input of the new transaction 152_j_ matches a condition defined in the output of the preceding transaction 152_i_ which the new transaction assigns, wherein this condition typically comprises at least checking that the cryptographic signature or other authorisation in the input of the new transaction 152_j_ unlocks the output of the previous transaction 152_i_ to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol.

Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorize (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
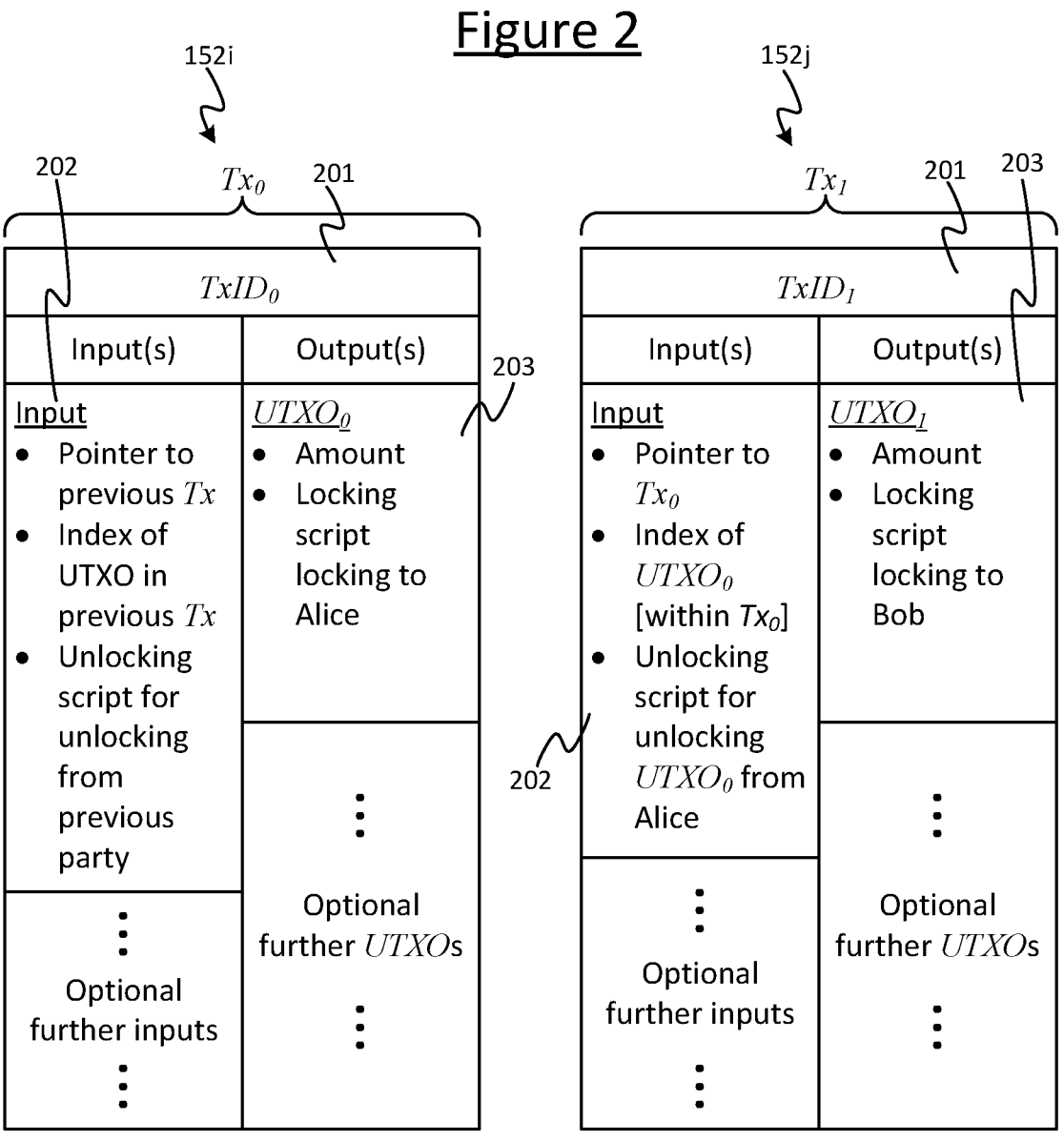
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol.

However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "Tx1". It takes an amount of the digital asset that is locked to Alice in the output 203 of a preceding transaction 152*i* in the sequence, and transfers at least some of this to Bob. The preceding transaction 152*i* is labelled "Tx0" in FIG. 2. Tx0 and Tx1 are just arbitrary labels. They do not necessarily mean that Tx0 is the first transaction in the blockchain 151, nor that Tx1 is the immediate next transaction in the pool 154. Tx1 could point back to any preceding (i.e. antecedent) transaction that still has an unspent output 203 locked to Alice.

The preceding transaction Tx0 may already have been validated and included in a block 151 of the blockchain 150 at the time when Alice creates her new transaction Tx1, or at least by the time she sends it to the network 106. It may already have been included in one of the blocks 151 at that time, or it may be still waiting in the ordered set 154 in which case it will soon be included in a new block 151. Alternatively Tx0 and Tx1 could be created and sent to the network 106 together, or Tx0 could even be sent after Tx1 if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction Tx0 comprises a particular UTXO, labelled here UTXO0. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, UTXO0 in the output 203 of Tx0 comprises a locking script [Checksig PA] which requires a signature Sig PA of Alice in order for UTXO0 to be redeemed (strictly, in order for a subsequent transaction attempting to redeem UTXO0 to be valid). [Checksig PA] contains a representation (i.e. a hash) of the public key PA from a public-private key pair of Alice. The input 202 of Tx1 comprises a pointer pointing back to Tx1 (e.g. by means of its transaction ID, TxIDO, which in embodiments is the hash of the whole transaction Tx0). The input 202 of Tx1 comprises an index identifying UTXO0 within Tx0, to identify it amongst any other possible outputs of Tx0. The input 202 of Tx1 further comprises an unlocking script <Sig PA> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction Tx1 arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig PA><PA>‖[Checksig PA]

where "‖" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key PA of Alice, as included in the locking script in the output of Tx0, to authenticate that the unlocking script in the input of Tx1 contains the signature of Alice signing the expected portion of data. The expected portion of data itself (the "message") also needs to be included in order to perform this authentication. In embodiments the signed data comprises the whole of Tx1 (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in Tx1 meets the one or more conditions specified in the locking script of Tx0 (so in the example shown, if Alice's signature is provided in Tx1 and authenticated), then the blockchain node 104 deems Tx1 valid. This means that the blockchain node 104 will add Tx1 to the ordered pool of pending transactions 154. The blockchain node 104 will also forward the transaction Tx$_1$ to one or more other blockchain nodes 104 in the network 106, so that it will be propagated throughout the network 106. Once Tx$_1$ has been validated and included in the blockchain 150, this defines UTXO$_0$ from Tx$_0$ as spent. Note that Tx$_1$ can only be valid if it spends an unspent transaction output 203. If it attempts to spend an output that has already been spent by another transaction 152, then Tx$_1$ will be invalid even if all the other conditions are met. Hence the blockchain node 104 also needs to check whether the referenced UTXO in the preceding transaction Tx$_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in UTXO$_0$ in Tx$_0$ can be split between multiple UTXOs in Tx$_1$. Hence if Alice does not want to give Bob all of the amount defined in UTXO$_0$, she can use the remainder to give herself change in a second output of Tx$_1$, or pay another party.

In practice Alice will also usually need to include a fee for the bitcoin node 104 that successfully includes her transaction 104 in a block 151. If Alice does not include such a fee, T$_{X0}$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Client Software

Figure 3A:
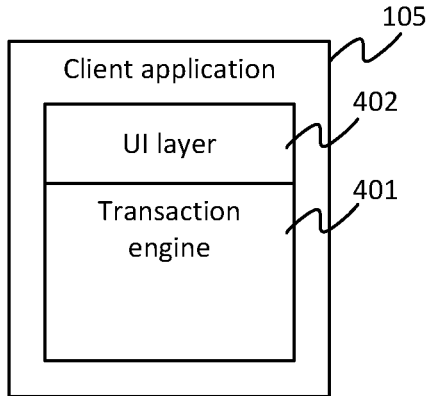
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, send transactions to one or more nodes 104 to be propagated through the blockchain network 106, in accordance with the schemes discussed above and as discussed in further detail shortly.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
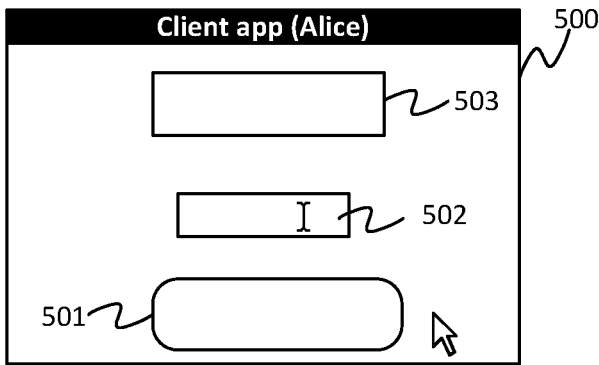
FIG. 3B is a schematic mock-up of an example user interface that may be presented by the client application of FIG. 3A.

FIG. 3B gives a mock-up of an example of the user interface (UI) 500 which may be rendered by the UI layer 402 of the client application 105a on Alice's equipment 102a. It will be appreciated that a similar UI may be rendered by the client 105b on Bob's equipment 102b, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103a) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to formulate transactions 152 and send transactions to one or more nodes 104 to be propagated through the blockchain network 106

Alternatively or additionally, the UI elements may comprise one or more data entry fields 502, through which the user can formulate transactions 152 and send transactions to one or more nodes 104 to be propagated through the blockchain network 106. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

Node Software

Figure 4:
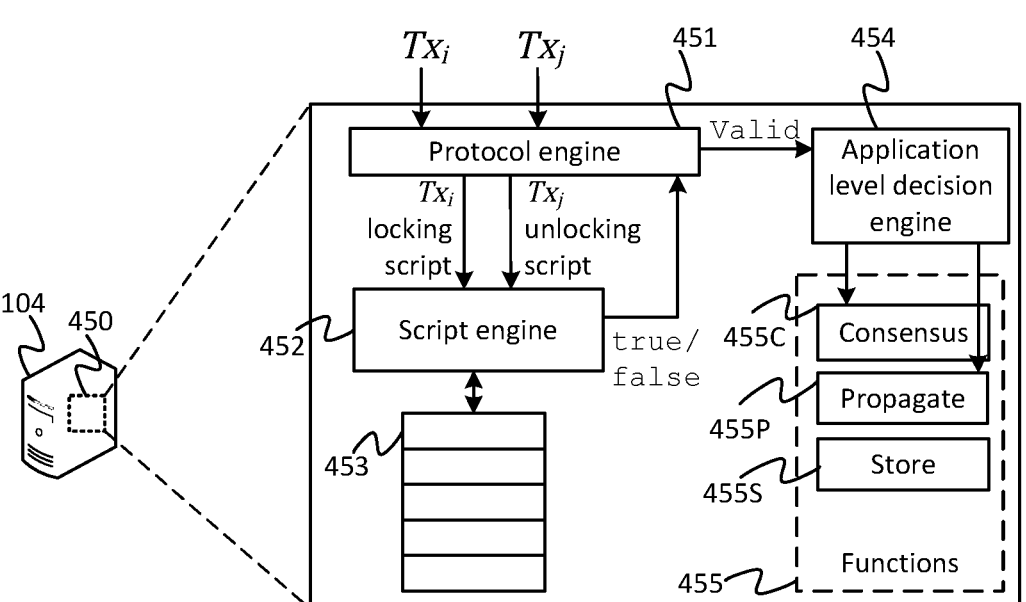
FIG. 4 is a schematic block diagram of some node software for processing transactions.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152j (Tx$_j$) is received having an input pointing to an output (e.g. UTXO) of another, preceding transaction 152i (Tx$_{m-1}$), then the protocol engine 451 identifies the unlocking script in Tx$_j$ and passes it to the script engine 452. The protocol engine 451 also identifies and retrieves Tx$_i$ based on the pointer in the input of Tx$_j$. Tx$_i$ may be published on the blockchain 150, in which case the protocol engine may retrieve Tx$_i$ from a copy of a block 151 of the blockchain 150 stored at the node 104. Alternatively, Tx$_i$ may yet to have been published on the blockchain 150. In that case, the protocol engine 451 may retrieve Tx$_i$ from the ordered set 154 of unpublished transactions maintained by the node 104. Either way, the script engine 451 identifies the locking script in the referenced output of Tx$_i$ and passes this to the script engine 452.

The script engine 452 thus has the locking script of Tx$_i$ and the unlocking script from the corresponding input of Tx$_j$ For example, transactions labelled Tx$_0$ and Tx$_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of Tx$_j$ does not exceed the total amount pointed to by its inputs, and that the pointed-to output of Tx$_i$ has not already been spent by another valid transaction. The protocol engine 451 evaluates the result from the script engine 452 together with the one or more protocol-level conditions, and only if they are all true does it validate the transaction Tx$_j$. The protocol engine 451 outputs an indication of whether the transaction is valid to the application-level decision engine 454. Only on condition that Tx$_j$ is indeed validated, the decision engine 454 may select to control both of the consensus module 455C and the propagation module 455P to perform their respective blockchain-related function in respect of Tx$_j$. This comprises the consensus module 455C adding Tx$_j$ to the node's respective ordered set of transactions 154 for incorporating in a block 151, and the propagation module 455P forwarding Tx$_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Blocking Data

As noted above, the script pattern OP_FALSE OP_RETURN facilitates the inclusion of data to be uploaded to a blockchain in an unspendable output. For this to occur, a user typically pays a small fee that is dictated by the size of the data they are uploading. In Bitcoin SV for example, the transaction data payload size is virtually unlimited, so users may upload anything from simple text to full videos. On other blockchains an output can be made unspendable using only the script pattern OP_RETURN.

The script opcode OP_RETURN and the combination of script opcodes OP_FALSE OP_RETURN that may be used to store arbitrary data on the ledger leads to an increase in the size of the blockchain and consumes the disk space of blockchain nodes who are required to store the full data.

In a scenario where the distribution of some data payloads (e.g., bank account numbers, passport numbers) within bitcoin transactions have been blocked by a governing authority, at first glance this is not a big problem: the payload is in an unspendable output, so blocking this data does not restrict the movement of coins. Therefore, the UTXO set is not affected by this action. However, a challenge is presented when a third party would like to validate the UTXO set. This is because all the fields of a transaction are needed to produce the transaction ID (which is equal to the double hash of all the data in the transaction). Therefore, without the blocked data, a third party cannot validate the integrity of spendable outputs of the transaction. In addition, a third party would be unable to validate the block containing the transaction, as the transaction ID is required when calculating the Merkle root of all transactions, which is stored in the block header. This challenge is faced for example when a new miner enters the bitcoin network. They must download the entire blockchain and validate every transaction to construct the UTXO set. They can do this if-and-only-if all data is available to them and it has not been tampered with. This is what is referred to as the immutability of the blockchain.

Embodiments of the present disclosure enable network participants to block data while still being able to verify the integrity of the blockchain's history. Embodiments of the present disclosure can be used to block any data present in a blockchain transaction or a portion thereof.

Figure 5:
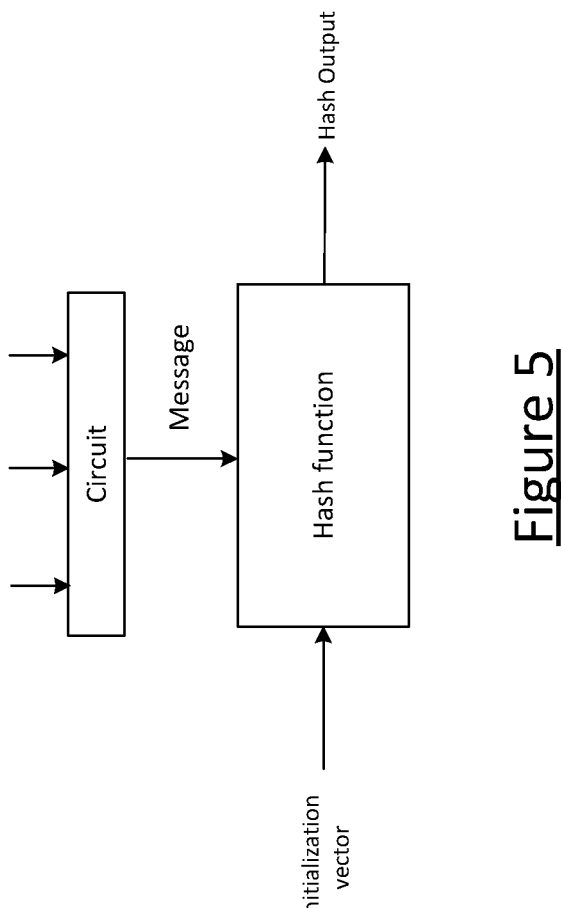
FIG. 5 illustrates the inputs and outputs of a hash function, FIGS. 6$a$-6$d$ illustrates a process for blocking data in a message.

FIG. 5 illustrates a hash function which receives as input an initialization vector and an input message (preimage) and provides a hash output (hash digest). A hash function H is a function that maps data of arbitrary size to data of fixed size. Namely, a k-bit hash function H is a function defined as:

$$H{:}\{0,1\}^* \rightarrow \{0,1\}^k$$

where k is a positive integer.

Cryptographic hash functions must have the following properties:

Deterministic: A hash function must produce the same digest for the same preimage.

Speed: A hash digest must be able to be computed quickly.

One-way (pre-image resistance): Given a digest, it must be infeasible to find the preimage.

Weak collision resistance (second pre-image resistance): Given a hash value, it should not be feasible to generate an arbitrary message that produces the same hash.

Strong collision resistance: it should not be feasible that two preimages will result in the same hash.

Diffusion: A change of at least a single bit of the preimage causes each bit in the digest to change with 50% probability.

Hash functions provide a method of checking the integrity of some data. For any given data as the preimage to a hash digest, a person may check the integrity of that data at a later date by comparing its current hash digest to its previous one.

Typically in order to validate the hash output, a third party would need all of the contents of the input message. Embodiments of the present disclosure enable a third party to validate that a hash output is valid without having access to sensitive parts of the message. "Sensitive" data is referred to herein to any data which a user or governing entity may want to block. The sensitive data may be private to a user (e.g., a bank account number, a passport number), illegal, malicious, defamatory, libellous, or indecent. As shown in FIG. 5, in contrast to known techniques, in embodiments of the present disclosure the input message (preimage) is used to determine a public message, a sensitive message, and a mask which identifies the locations of the public bit(s) and the sensitive bit(s) in the input message. The sensitive message is determined such that when it is provided as an input into a logic circuit (which also receives the public message and mask as inputs) the logic circuit provides, as an output, the input message (preimage) to a hash function. As will be explained in more detail below the inputs to the logic circuit are used to generate a zero knowledge proof which allows sensitive bits of the input message to be blocked/hidden whilst allowing other data in the input message to be publicly accessible. Sensitive bits located anywhere in the input message may be blocked/hidden from a recipient. Embodiments of the present disclosure enable flexibility for a person to generate different masks to enable them to selectively disclose different portions of information of the same data to different entities at different times.

FIGS. 6a-d is a flowchart illustrating a process 600 for blocking data in a message in accordance with embodiments of the present disclosure. The process 600 may be performed by a computing device.

Embodiments of the present disclosure are first described with reference to the message comprising blockchain transaction data and the process 600 being performed by a blockchain node 104. In these examples, the message may be all of, or part of, one or more blockchain transactions.

Figure 7:
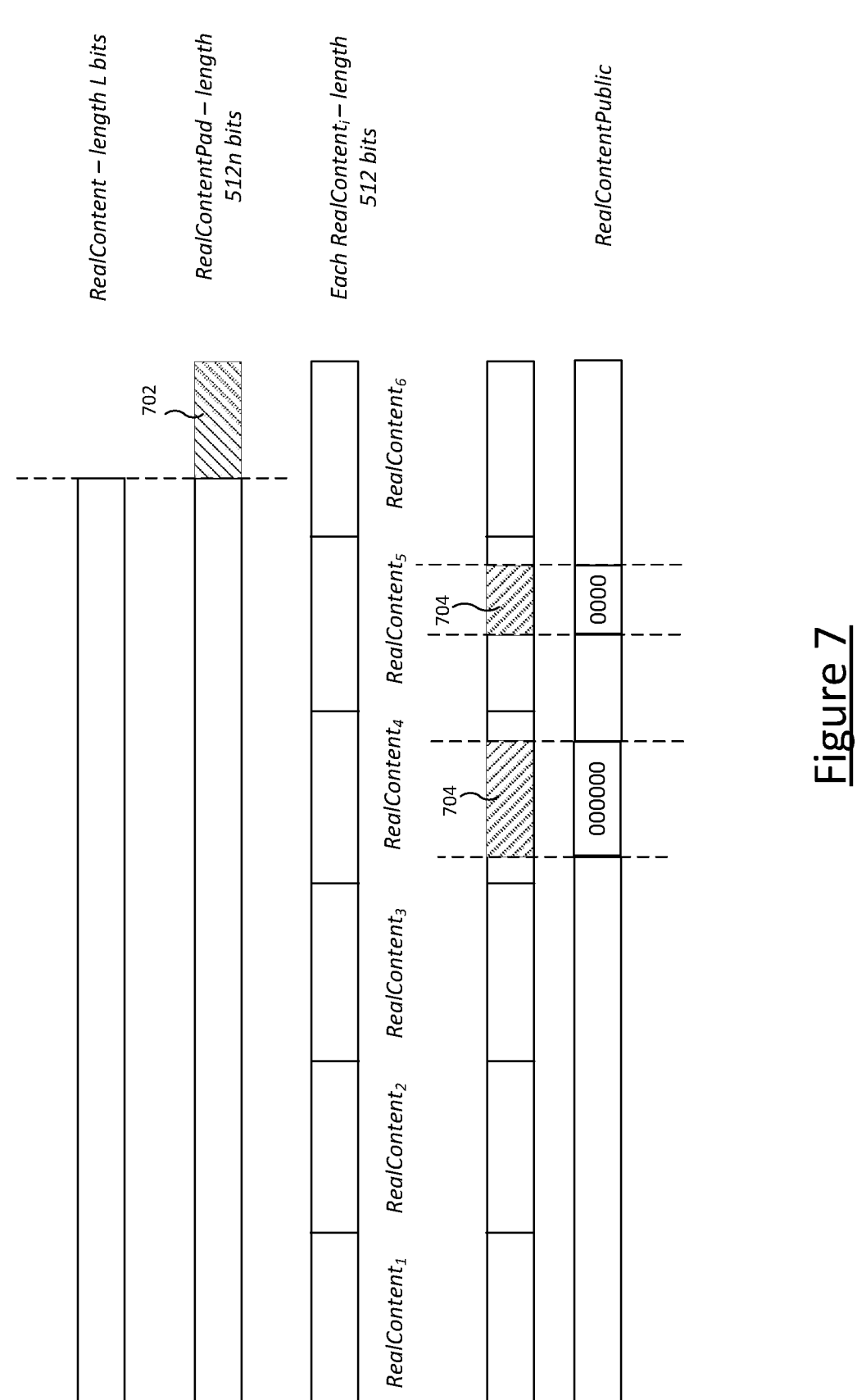
FIG. 7 illustrates the generation of a modified message.

At step S602, the blockchain node 104 receives a message in the form of a blockchain transaction, and at step S604 creates a copy of the blockchain transaction which is referred to herein as RealContent. As shown in FIG. 7, RealContent has a length of L bits. This copy is conveyed as the real data but the blockchain node 104 controls what information should actually be visible on that particular copy.

At step S604, the blockchain node 104 pads the message string RealContent with padding bits 702 in accordance with a hashing algorithm to generate a message string which is referred to herein as RealContentPad. As a result of the padding, the message string RealContentPad has a length which is a positive integer multiple of an input message size defined by the hashing algorithm. One example hashing algorithm is the SHA256 hash function.

In terms of bitcoin, the SHA256 hash function is used to derive the TxID of a transaction. In particular, the Transaction ID (TxID) is the double SHA256 hash (or SHA256d=SHA256(SHA256(.))) of a serialized Bitcoin transaction (e.g., a 32 bit Version, a 32 bit LockTime, a list of transaction inputs, a list of transaction outputs including Data).

The compression function of SHA256 is:

$$F{:}\{0,1\}^{256} \times \{0,1\}^{512} \rightarrow \{0,1\}^{256}$$

where it compresses a 256-bit chaining value and a 512-bit message block into a 256-bit output value. Thus as shown in FIG. 7, the message string RealContentPad may have a length of 512n bits whereby n is a positive integer.

Assuming that the length of the message RealContent is e which is 447 bits the padding performed at step S604 comprises appending a single bit having a value of one to the end of RealContent. Then k zero bits are added where k is the smallest positive solution to the equation $1+1+k=448$ mod 512. Finally a 64-bit block is added which is a representation of the message length e written in binary form. For example, assume that the message RealContent has length of 24 bits. The message RealContent is first padded with 1, then $448-(24+1)=423$ zero bits are added together with the 64-bit block to convert RealContent into a 512-bit padded message, RealContentPad.

Common hash functions follow an iterative approach (known as Merkle-Damgård construction) to process longer messages M (greater than or equal to 448 bits); they divide M into n blocks of k bits, i.e., $M=M_0, \ldots, M_{n-1}$, where $|M_i|=k$ for $i=0, \ldots, n-1$. Individual message blocks are processed iteratively by a compression function which is defined as F: $\{0,1\}^k \times \{0,1\}^m \rightarrow \{0,1\}^k$ where m, k are positive integer values and k denotes the size of the chaining value and m the size of the message block.

Figure 6A:
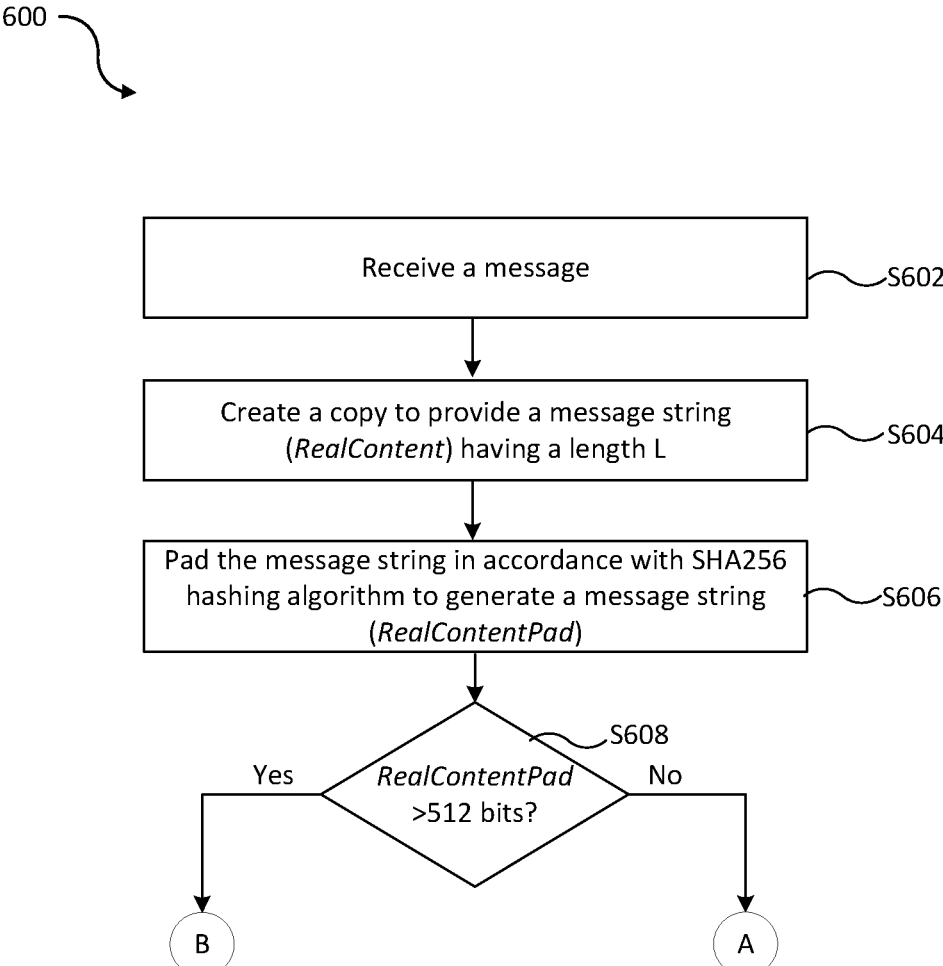
Figure 6B:
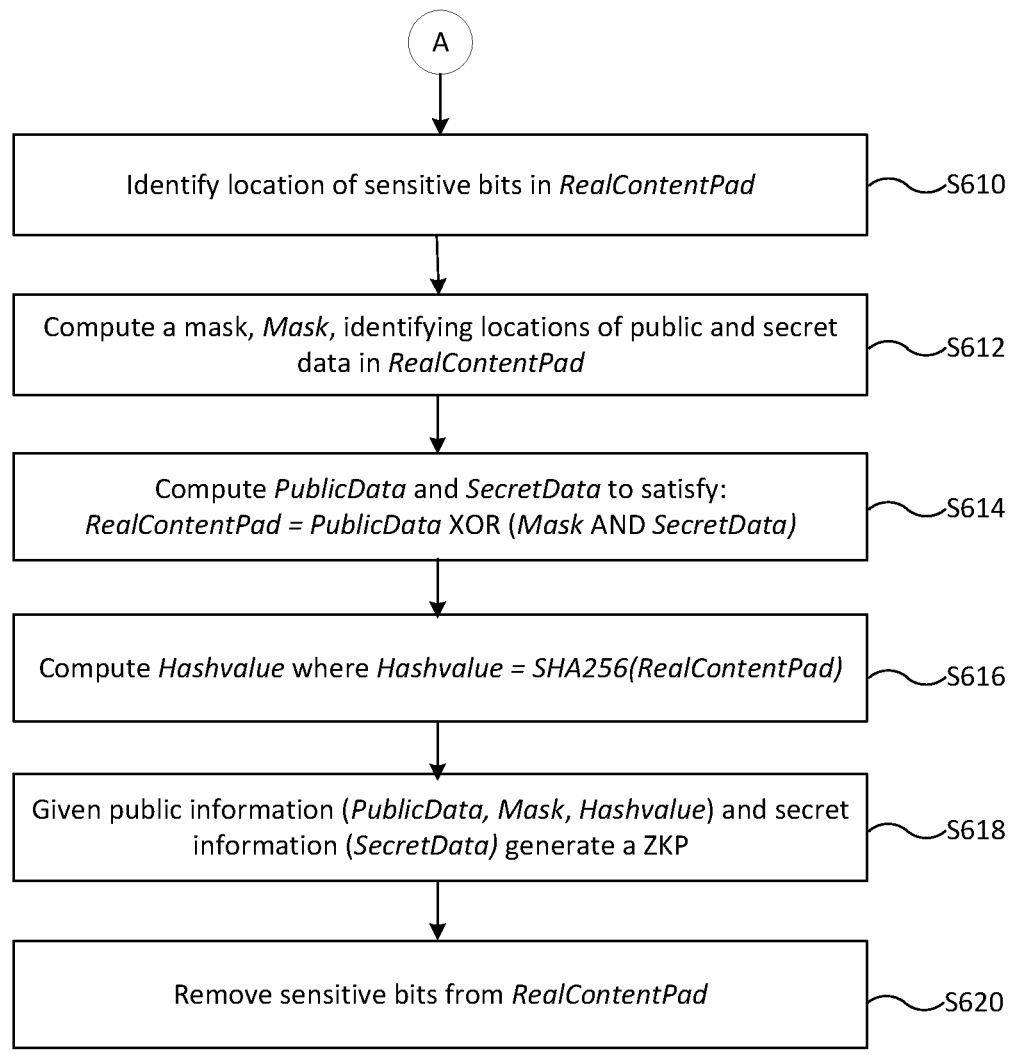

If RealContentPad has a length which is equal to 512 bits (see step S608), the process 600 proceeds to step S610 shown in FIG. 6b.

At step S610, the blockchain node 104 identifies the locations of at least one sensitive bit in bits of the 512-bit padded message, RealContentPad. The blockchain node 104 performs step S610 by querying the memory of the blockchain node 104.

For example, the memory of the blockchain node 104 may store one or more bit strings corresponding to content that has been previously identified as sensitive.

In another example, the memory of the blockchain node 104 may store one or predefined rules that define sensitive data. For example, the memory may store a predefined rule that states any URL comprising a certain domain name should be blocked. In another example, the memory may store a predefined rule that any 9 digit number that follows the words "passport number" should be blocked.

At step S612, the blockchain node 104 generates a mask bit string, Mask, which identifies the locations of the public bit(s) and the sensitive bit(s) in the 512-bit padded message, RealContentPad. In particular, the blockchain node 104 generates the mask bit string, Mask, according to Mask[i]=1 if RealContentPad[i] is secret, and
Mask[i]=0 if RealContentPad[i] is public
for every i-th bit of RealContentPad.

In other embodiments, as an alternative to steps S610 and S612, the blockchain node 104 may obtain the mask bit string, Mask, by retrieving the mask bit string from memory of the blockchain node 104. Regardless of how the mask bit string, Mask, is obtained, in this embodiment the mask bit string, Mask, has a length of 512-bits.

At step S614, the blockchain node 104 computes a public bit string, PublicData, by modifying RealContentPad by assigning all of the sensitive bit(s) with the same predetermined value (e.g. a zero or one) and retaining the public bit values. Thus in this embodiment, the public bit string, PublicData, has a length of 512-bits. To illustrate how the public bit string, PublicData, may be computed we refer herein to modifying RealContentPad by assigning all of the sensitive bit(s) with a zero value, however this is just an example.

At step 614, the blockchain node 104 also computes a secret bit string, SecretData, which has a length of 512-bits and includes the sensitive bit(s). The blockchain node 104 may compute the secret bit string, SecretData, by taking RealContentPad and retaining the sensitive bit(s) included therein, wherein the remaining bits of SecretData can take any value.

The secret bit string, SecretData, satisfies a requirement that RealContentPad is equal to an output of a bitwise logical calculation (involving a plurality of logical operations) which uses the public bit string, PublicData, and the secret bit string, SecretData, and the mask bit string, Mask, as inputs.

As one example, the secret bit string, SecretData, may satisfy a requirement that:

RealContentPad=PublicData XOR (SecretData AND Mask).

Figure 8:
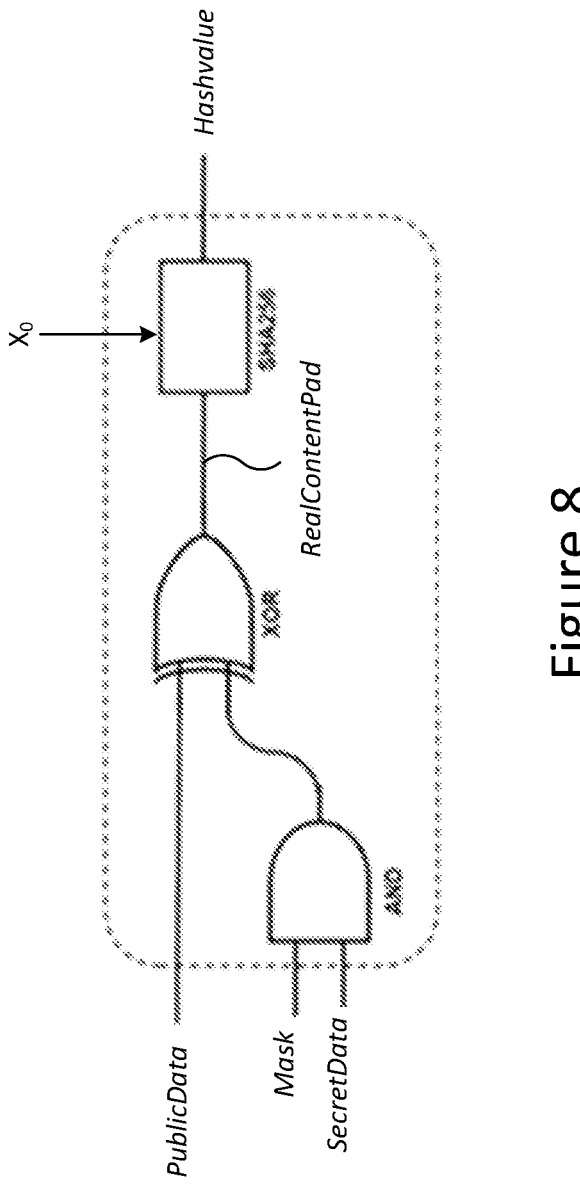
FIG. 8 illustrates a circuit used to generate a zero knowledge proof that applies a single compression.

In particular, the secret bit string, SecretData, satisfies a requirement that RealContentPad is equal to a bitwise XOR calculation of (i) the public bit string and (ii) a result of a bitwise AND calculation of the mask bit string and the secret bit string. This construction is illustrated in FIG. 8 as part of a circuit illustrated by the dashed line. It will be appreciated that other logic circuit constructions to that described above and shown in FIG. 8 are possible provided that the logic circuit construction takes as inputs (i) the public bit string, PublicData, (ii) the secret bit string, SecretData, and (iii) the mask bit string, Mask, and the bitwise logical operations included therein provide RealContentPad as the output.

At step S616 the blockchain node 104 computes a hash value, Hashvalue, by hashing the message string RealContentPad, where Hashvalue=SHA256(RealContentPad). The public initialization vector $$H_0^i$$

used in step S616 will be from the Secure Hash Standard (SHS) in embodiments when the SHA256 hashing algorithm is used. For SHA256, the initial hash value, $$H_0^i,$$

shall consist of the following eight 32-bit words $(H_0 = H_0^0 \| H_0^1 \| \ldots \| H_0^7)$:

$H_0^0 = 11010100000100111100110011001001111( = 6a09e667)$ $H_0^1 = 10111011011001111010111010000101( = bb67ae85)$ $H_0^2 = 11110001101110111001101110010( = 3c6ef372)$ $H_0^3 = 10100101010011111111010100111010( = a54ff53a)$ $H_0^4 = 10100010000111001010010011111111( = 510e527f)$ $H_0^5 = 10011011000001010110100010001100( = 9b05688c)$ $H_0^6 = 11111100000111101100110101011( = 1f83d9ab)$ $H_0^7 = 10110111110000011001101000110011001( = 5be0cd19)$

At step S618, the blockchain node 104 generates a zero knowledge proof using:

the public bit string, PublicData
the mask bit string, Mask
the output hash value, Hashvalue
the secret bit string SecretData Zero-Knowledge Proofs (ZKPs) are cryptographic building blocks that allow a party (the prover) to prove to another (the verifier) that a statement is true without revealing any information other than the truth of the statement.

The zero knowledge proof generated at step S618 is a type of proof where the prover not only proves the validity of the statement but also ensures that it knows a secret piece of information, without revealing anything about it.

While interactive zero-knowledge proofs require interaction between the prover and the verifier, there also exist Non-Interactive Zero-Knowledge (NIZK) Proofs where the prover produces just one message called a 'proof' to convince the verifier that the statement is true. The zero knowledge proof generated at step S618 may be a NIZK proof.

A zkSNARK (Zero-Knowledge Succinct Non-Interactive Argument of Knowledge) is a NIZK proof of knowledge that is succinct and for which proofs are very short and easy to verify. The statement is represented in terms of logic circuits that is used to generate a proof of the statement. In the most efficient constructions, the verifier simply performs a constant number of group operations. The zero knowledge proof generated at step S618 may be a zkSNARK proof.

In the example where the zero knowledge proof generated at step S618 is a zkSNARK proof, a proving key (retrieved from memory of the blockchain node 104) is additionally used in the generation of the zkSNARK proof.

A zkSNARK protocol generally consists of three phases:

a. Setup: Given a statement, a prover and verification key pair is computed through several internal steps that include Algebraic circuit generation, R1CS (Rank-1 Constraint System) and QAPs (Quadratic Span Programs). The private information must be destroyed and never come into existence again as anyone accessing these can create attacks.

b. Proof generation: Given the public information, prover key, public and private inputs, the prover generates a proof and sends it to the verifier.

c. Verification: Given public information, the verification key, and public input, the verifier performs verification.

A zkSNARK protocol should satisfy the following properties:

Completeness: If the statement is true, and the verifier and prover are honest, then the proof is accepted.

Soundness: If the statement is false, a cheating prover cannot convince an honest verifier that it is true except with negligible probability.

Zero-Knowledge: A zero knowledge proof reveals no information to the verifier beside the truth of the statement.

Succinct: The proof is shorter than the circuit size and the verifier must do a lower number of cryptographic operations than the circuit size.

Non-Interactive: The proof is sent to the verifier in one step only.

Arguments of Knowledge: The proof is considered to be computationally sound. Namely, an unbounded prover (like quantum computers) can prove false statements without being detected.

Knowledge: Prover indeed knows the witness and cannot construct the proof without having access to the witness (which is the private input needed to prove the statement), i.e., there is an extractor algorithm that interacts with prover and outputs the witness.

The zero knowledge proof generated at step S618 may be any other know type of zero knowledge proof such as multi-party computation (MPC) based zero knowledge proof (e.g., zkBOO), zkSNARK, STARK, or Bulletproofs.

As is known by persons skilled in the art, proving and verification keys work within the context of zkSNARKs but do not work with the other types of zero knowledge proofs such as MPC based proofs (such as zkBOO), STARK, or Bulletproofs.

At step S620, the blockchain node 104 removes the sensitive bit(s) from the message string RealContentPad to generate a modified message (e.g. a modified blockchain transaction) RealContentPublic. In one example, the blockchain node 104 performs step S620 by assigning all of the sensitive bit(s) with the same predetermined value (e.g. a zero) and retaining the public bit values of RealContentPad. It will be appreciated that in this example whereby RealContentPad has a length which is equal to 512 bits, the modified message RealContentPublic also has a length which is equal to 512 bits.

Once the modified message (e.g. a modified blockchain transaction) is generated, the original message may be removed from memory of the computing device and replaced with the modified message. Alternatively, the original message may be retained in memory of the computing device after generation of the modified message (e.g., a modified blockchain transaction).

The modified blockchain transaction RealContentPublic is then output to a recipient. For example, the modified blockchain transaction RealContentPublic may be sent to a recipient blockchain node 104 in the blockchain network 106.

To enable the recipient blockchain node 104 to prove that the modified blockchain transaction RealContentPublic is valid, the blockchain node 104 additionally sends:

the zero knowledge proof the output hash value, Hashvalue

If the mask bit string, Mask, is publicly known then there is no need for the blockchain node 104 to send the mask bit string, Mask, to the recipient blockchain node 104. However, if the mask bit string, Mask, is not publicly known then the blockchain node 104 will additionally send the mask bit string, Mask, to the recipient blockchain node 104.

Figure 10A:
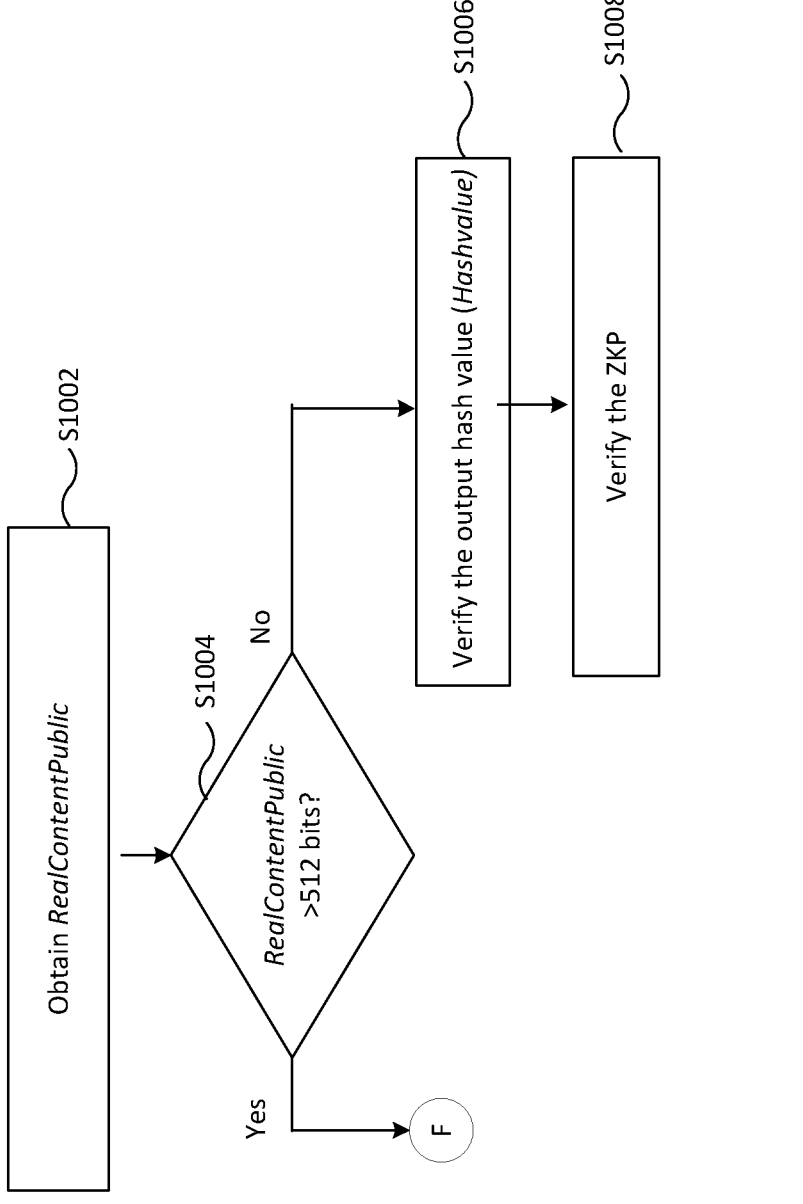
Figure 10A:
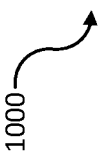

The verification process 1000 performed by a verifier computing device when RealContentPublic is 512 bits in length is shown in FIG. 10a. In embodiments whereby the computing device is a recipient blockchain node 104, at step S1002 the recipient blockchain node 104 obtains the modified blockchain transaction RealContentPublic. In one example, the recipient blockchain node 104 receives the modified blockchain transaction RealContentPublic from the sender blockchain node 104 (which performed the process 600). If the modified blockchain transaction RealContentPublic is 512 bits in length (determined at step S1004) the process 1000 proceeds to step S1006.

At step S1006, the recipient blockchain node 104 verifies the output hash value, Hashvalue by computing a SHA256 hash of the output hash value, Hashvalue, to check that SHA256 (Hashvalue) is equal to the public transaction ID associated with the modified blockchain transaction RealContentPublic. If this verification fails, the process 1000 ends. If the recipient blockchain node 104 successfully verifies the output hash value, Hashvalue, the process 1000 proceeds to step S1008.

At step S1008, the recipient blockchain node 104 verifies the zero knowledge proof, using:

the zero knowledge proof the modified message RealContentPublic an input hash value (in this scenario, the initialization vector $$H_0^i)$$

used at step S616 the output hash value, Hashvalue the mask bit string, Mask

If the recipient blockchain node successfully verifies the zero knowledge proof, the recipient blockchain node 104 is able to verify that the modified blockchain transaction RealContentPublic is valid.

In the example where the zero knowledge proof generated at step S618 is a zkSNARK proof, a verification key (retrieved from memory of the recipient blockchain node 104) is additionally used in the verification of the zkSNARK proof.

As is known to a person skilled in the art verifying a zero knowledge proof comprises one or more checks using the input information, and the output of the verifying is a decision indicating that the zero knowledge proof is valid or not valid. The checks performed are specific to the type of zero knowledge proof and are known to persons skilled in the art. For all types of zero knowledge proof the verifier only accepts the zero knowledge proof if all checks pass.

In the context of a zkSNARK proof, the circuit (e.g. as shown in FIG. 8) is being used during the setup phase, meaning the setup parameters (proving key and verification key) ensure that the dedicated circuit is indeed used. The prover uses the proving key as well as the circuit to generate the zkSNARK proof. The verifier will perform checks using the verification key. The verification key will ensure the verifier that the pre-defined statement (meaning the circuit) is indeed being validated without the verifier directly using the circuit. In contrast, in the context of Bulletproofs, the prover and the verifier first agree on a circuit. Next, based on the circuit, the prover generates the proof and then sends it to the verifier for validation. The verifier also uses the knowledge of the circuit to validate the proof. Other MPC based proofs are similar to Bulletproofs in that the verifier directly used the circuit in the verification process.

Steps S1006 and S1008 may be performed in any order, however it is advantageous to perform step S1006 first and then only proceed to perform step S1008 if the check at step S1006 passes successfully because step S1006 is less computationally intensive to perform than step S1008.

We refer below to a simple example to illustrate the effect of the mask bit string, Mask. Assume that Alice has Real-Content="1101 1011" where the first four bits "1101" correspond to her public data that she can share with others and "1011" is her private data.

Assume also that Alice needs to share RealContent with Bob but only wants to disclose the first four bits. Hence, for this particular example, Mask="0000 1111". Assume also that Bob knows Output=SHA256(RealContent)=SHA256 (1101 1011)

Without the mask bit string, Mask, the construction would be:

RealContent=PublicData XOR SecretData

If Alice was dishonest, then she could lie about the public data to Bob as follows (e.g., by changing 1101 to 0110).
1. Alice chooses the fake public data as PublicData=0110 0000 whereby each of the sensitive bits "1011" have been set to zero.
2. She also chooses the entire 8 bits 1011 1011 as the secret data.
   a. Note that 1101 1011=0110 0000 XOR 1011 1011, where the output hash value of the circuit would be the same as the real Output=SHA256(1101 1011).
Hence, without a mask, she could lie about the public portions of the data while the proof would still be valid.

However, if the mask was used and publicly known then this attack would not be possible because:
a. She chooses fake input PublicData=0110 0000 and shares with Bob. 1011 1011 is the secret data which is partially fake (i.e., the leftmost four bits).
b. Bob knows the mask value 0000 1111.
c. Given 0110 0000, 0000 1111, and Output (=SHA256 (1101 1011)), the zkSNARK proof will not be validated by Bob because
   1101 1011≠0110 0000 XOR (0110 1011 AND 0000 1111)
   1101 1011≠0110 0000 XOR 0000 1011
   1101 1011≠0110 1011

Hence, dishonest Alice would not be able to manipulate the content without being detected.

Whilst in the above example, each of the sensitive bits of "1011" were set to zero, this is merely an example. As an alternative, each of the sensitive bits of "1011" could have been set to one such that PublicData=0110 1111. This would have resulted in the logical computation changing to:

RealContent=(PublicData AND NOT(Mask)) XOR (SecretData AND Mask)

The results in the scenario above of using zeros:
   0110 1111 AND NOT(0000 1111)
   which results in
   0110 0000

However, setting each of the sensitive bits to one is less efficient than setting each of the sensitive bits to zero because an extra operation (AND) is needed.

We now refer back to FIG. 6a.

Figure 6C:
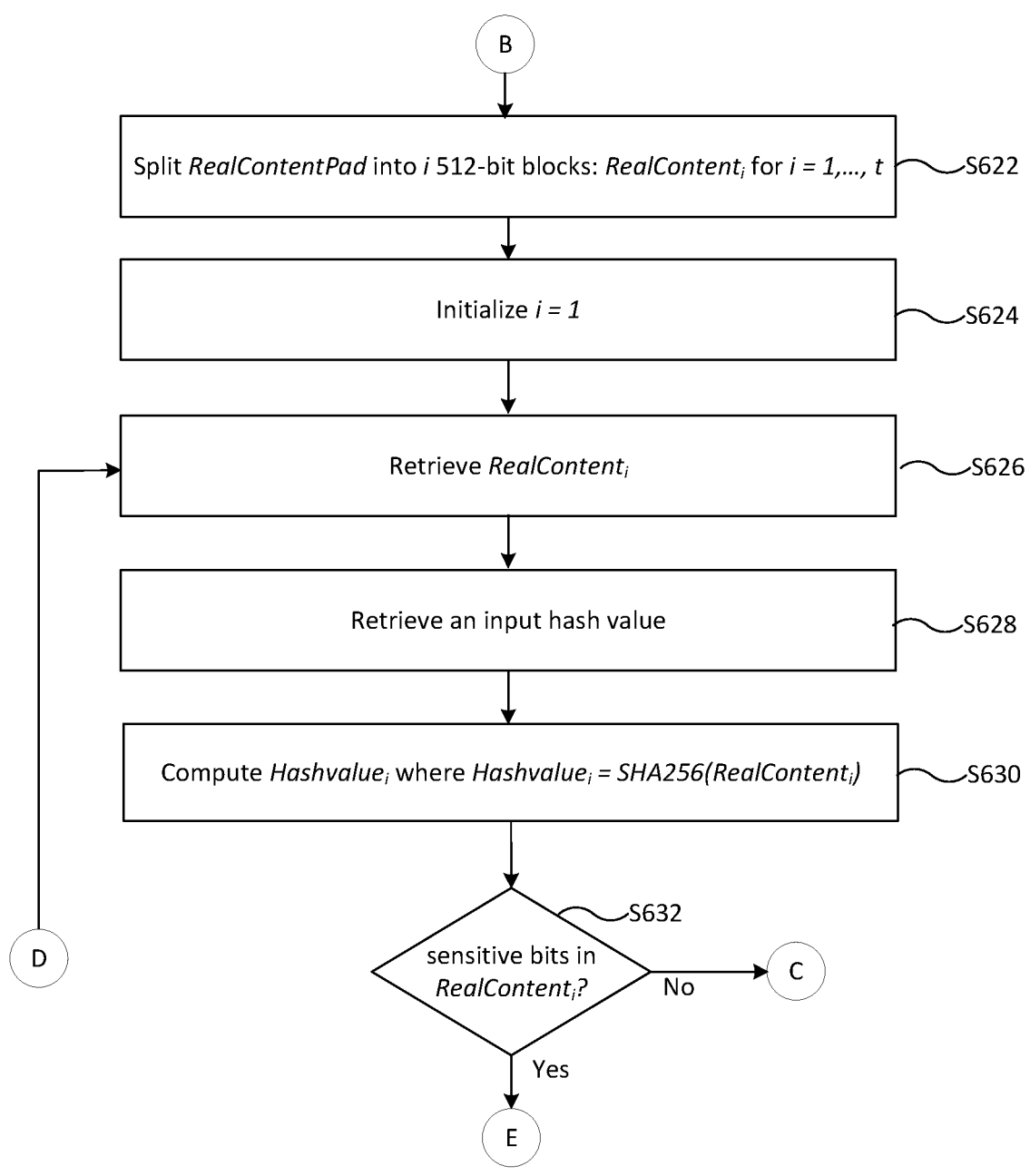

If RealContentPad has a length which is greater than 512 bits, i.e., it has a length of 512n bits where $n \geq 2$ (see step S608), the process 600 proceeds to step S622 shown in FIG. 6c. That is, if the size of RealContent is greater than 447 bits then the process 600 proceeds to step S622 shown in FIG. 6c.

At step S622, the blockchain node 104 splits the message string RealContentPad into a plurality of message blocks, $RealContent_i$, each having a length of 512 bits which corresponds to the input message size defined by the hashing function:

RealContentPad=RealContent₁‖ . . . ‖RealContentₜ where $|RealContent_i|=512$ bits for i=1, . . . , t.

FIG. 7 illustrates an example where RealContentPad is 3072 bits long and is split into six message blocks 512 bits in length.

At step S624, the value for i is set to 1 and at step S626 the blockchain node 104 retrieves $RealContent_i$. It will be appreciated that the first time step S626 is performed the blockchain node 104 retrieves the first 512 bit message block $RealContent_1$.

At step S628, the blockchain node 104 retrieves an input hash value. It will be appreciated that the first time step S628 is performed the blockchain node 104 retrieves a predetermined public initialization vector which will be from the Secure Hash Standard (SHS) in embodiments when the SHA256 hashing algorithm is used. For the subsequent times step S628 is performed the blockchain node 104 retrieves the previous output hash value i.e. $Hashvalue_{i-1}$. In the context of the SHA256 algorithm the input hash value is 256 its in length.

At step S630, the blockchain node 104 computes a hash value, $Hashvalue_i$, by hashing the message block $RealContent_i$, where $Hashvalue_i=SHA256(RealContent_i)$. The input hash value retrieved at step S628 is used in the compression performed at step S630. The hash value, $Hashvalue_{i-1}$, will be retrieved as the input hash value the next time step S628 is performed. For example the hash value, $Hashvalue_1$, is used as the input hash value for the compression of the second message block $RealContent_2$.

Figure 6D:
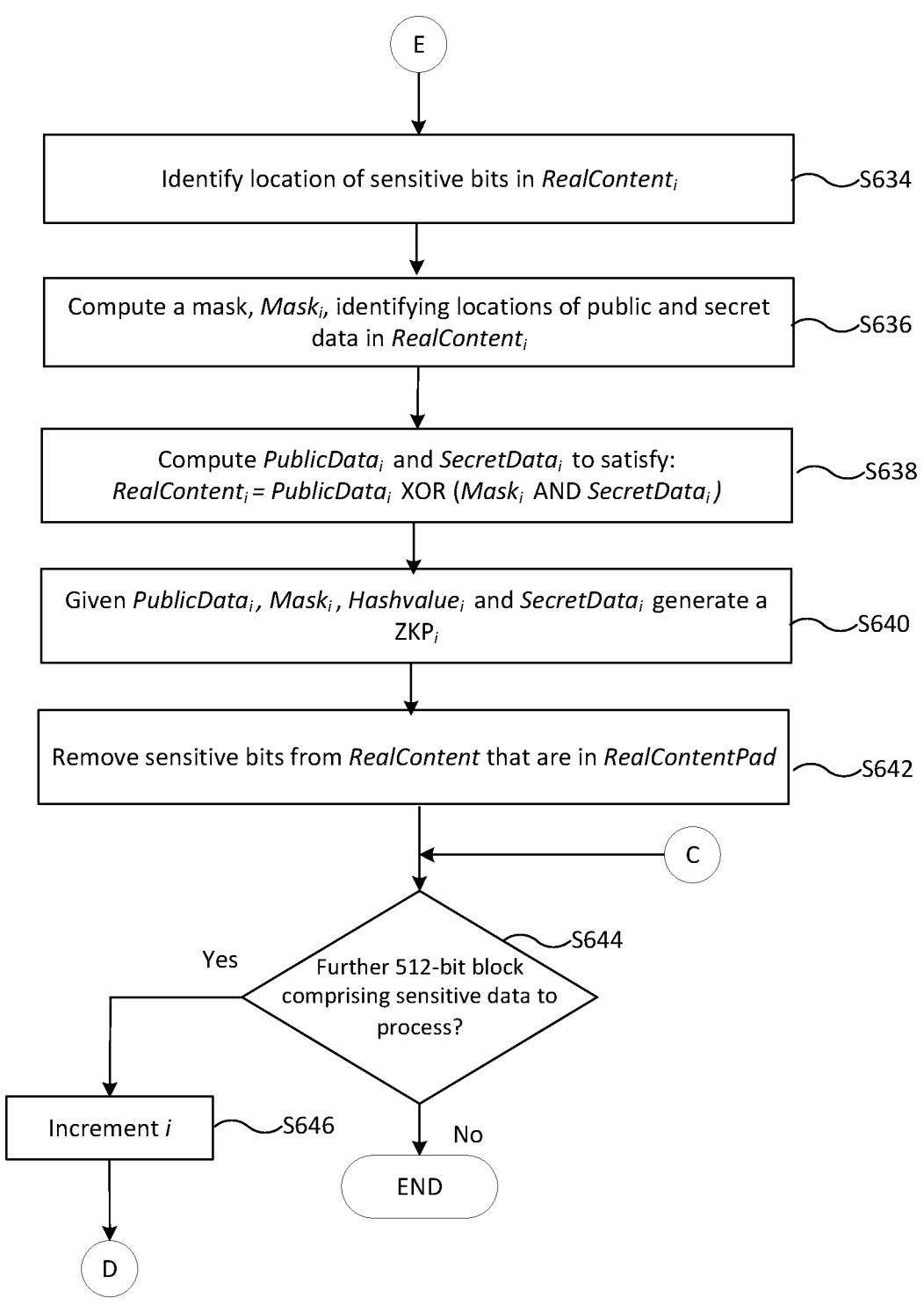

If the message block $RealContent_i$ does not comprise sensitive bits (determined at step S632) the process proceeds to step S644 shown in FIG. 6d. If there are further message blocks comprising sensitive data to process (determined at step S644) the process proceeds to step S646 where the blockchain node 104 increments the value for i by one and then the process 600 loops back to step S626 where the blockchain node 104 retrieves the next $RealContent_i$.

If the message block $RealContent_i$ comprises sensitive bits (determined at step S632) the blockchain node 104 performs step S634, S636, S638, S640 and S642 shown in FIG. 6d. Steps S634, S636, S638, S640 and S642 correspond to steps S610, S612, S614, S618 and S620.

At step S642, the blockchain node 104 removes any sensitive bits in RealContent; from RealContentPad. In one example, the blockchain node 104 performs step S642 by assigning all of the sensitive bit(s) in RealContentPad with the same predetermined value (e.g. a zero) and retaining the public bit values of RealContentPad.

As an alternative to steps S634 and S636, the blockchain node 104 may obtain the mask bit string, $Mask_i$, by retrieving the mask bit string from memory of the blockchain node 104. Regardless of how the mask bit string, $Mask_i$, is obtained, in this embodiment the mask bit string, $Mask_i$, has a length of 512-bits.

After step S642 is performed the process 600 proceeds to step S644 described above.

If there are no further message blocks comprising sensitive data to process (determined at step S644) the process 600 ends. At the end of the process 600, the blockchain node 104 will have removed all of the sensitive bits from the message string RealContentPad to generate a modified message (e.g., a modified blockchain transaction) RealContentPublic.

Figure 9:
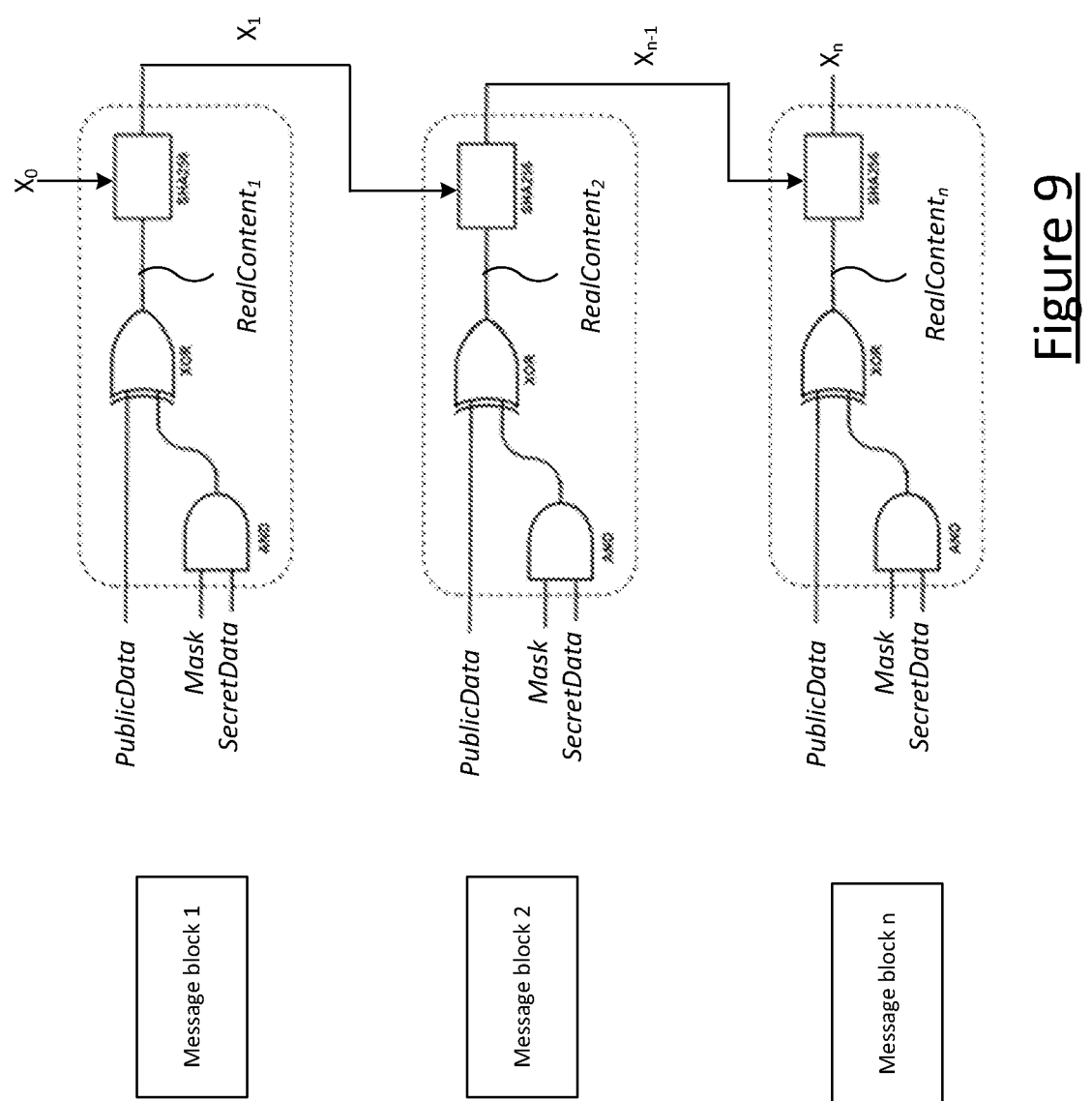
FIG. 9 illustrates a circuit used to generate at least one zero knowledge proof that applies multiple rounds of compression, and FIGS. 10$a$ and 10$b$ illustrates a process for verifying a modified message is valid.

It will be apparent from the above that in the process 600 a predetermined public initialization vector $X_0$, which will be from the Secure Hash Standard (SHS) in embodiments when the SHA256 hashing algorithm is used, is used in the compression of the first message block, $RealContent_1$. The digest, $Hashvalue_1$ of the first compression is used as the input hash value $X_1$ in the compression of the second message block, $RealContent_2$. The digest, $Hashvalue_2$ of the second compression is used as the input hash value $X_2$ in the compression of the third message block, $RealContent_3$, and so on. FIG. 9 illustrates an example circuit for this recursive hashing described above. As noted above, the exact bitwise logical operations used to derive the secret bit string SecretData, may vary to that shown in FIG. 9. For each message block, $PublicData_i$, $Mask_i$ and, SecretData; are 512 bits in length such that the final output of the bitwise logical calculation, $RealContent_i$, is 512 bits in length.

It will be apparent from the above, that in the process 600 for any message block $RealContent_i$ comprising sensitive bits, the blockchain node 104 generates a zero knowledge proof using:

the public bit string, $PublicData_i$
the mask bit string, $Mask_i$
the output hash value, $Hashvalue_i$
the secret bit string $SecretData_i$; and In the example where the zero knowledge proof generated at step S640 is a zkSNARK proof, a proving key (retrieved from memory of the blockchain node 104) is additionally used in the generation of the zkSNARK proof.

In scenarios whereby multiple message blocks have sensitive data, whilst FIGS. 6c and 6d show an iterative process, in some embodiments the proof generation process is performed in parallel. In these embodiments each of the message blocks are hashed using an input hash value which corresponds to the hashed output (digest) of the previous block (or a predetermined initialization vector $X_0$ as discussed above in the case of the first message block). The computed hash values, $Hashvalue_i$, associated with message blocks comprising sensitive data can then be used to generate zero knowledge proofs for these message blocks independently of each other and in parallel. With this parallel execution, N zero knowledge proofs can be created in the same amount of time as it takes to generate a single zero knowledge proof, assuming there are sufficient computing resources. This parallel proof generation advantageously allows efficient processing of large messages.

The modified blockchain transaction RealContentPublic is then output to a recipient. For example, the modified blockchain transaction RealContentPublic may be sent to a recipient blockchain node 104 in the blockchain network 106.

To enable the recipient blockchain node 104 to prove that the modified blockchain transaction RealContentPublic is valid, the blockchain node 104 additionally sends, for each $RealContent_t$ comprising sensitive bits:

the zero knowledge proof
the output hash value, Hashvalue;

If the mask bit string, $Mask_i$, is publicly known then there is no need for the blockchain node 104 to send the mask bit string, $Mask_i$, to the recipient blockchain node 104. However, if the mask bit string, $Mask_i$, is not publicly known then the blockchain node 104 will additionally send the mask bit string, $Mask_i$, to the recipient blockchain node 104.

The verification process 1050 performed by a verifier computing device when RealContentPublic is greater than 512 bits in length (i.e., it has a length of 512n bits where $n \geq 2$) is shown in FIG. 10b.

At step S1010 the computing device (e.g. a recipient blockchain node 104) obtains a hash value $Hashvalue_t$ of the final message block $RealContent_t$ of RealContentPublic and computes a SHA256 hash of $Hashvalue_t$, to check that SHA256($Hashvalue_t$) is equal to the public transaction ID associated with the modified blockchain transaction RealContentPublic.

In examples where the final message block $RealContent_t$ comprises sensitive bits the recipient blockchain node 104 receives the hash value $Hashvalue_t$ of the final message block $RealContent_t$ from the sender computing device. In examples where the final message block $RealContent_t$ does not comprise sensitive bits the recipient blockchain node 104 bits the recipient blockchain node 104 may receive the hash value $Hashvalue_t$ of the final message block $RealContent_t$ from the sender computing device. Alternatively, the recipient blockchain node 104 may compute a SHA256 hash of the final message block $RealContent_t$ (using the hash value output from the hashing of the preceding message block $RealContent_{t-1}$ as the input hash value) to generate the output hash value $Hashvalue_t$.

If this verification fails, the process 1050 ends. Step S1010 could be performed at the end of the process 1050 once there are no further message blocks to process however it is advantageous to perform step S1010 first and then only proceed to perform the zero knowledge proof verification if the check at step S1010 passes successfully because step S1010 is less computationally intensive to perform than the zero knowledge proof verification.

If the recipient blockchain node 104 successfully verifies the output hash value, $Hashvalue_t$, the process 1000 proceeds to step S1012.

At step S1012, the blockchain node 104 splits the message string RealContentPublic into a plurality of message blocks, $RealContent_i$, each having a length of 512 bits which corresponds to the input message size defined by the hashing function:

RealContentPublic=$RealContent_1 \| \dots \| RealContent_t$
where |$RealContent_i$|=512 bits for i=1, . . . , t.

At step S1014, the value for i is set to 1 and at step S1016 the blockchain node 104 retrieves $RealContent_i$. It will be appreciated that the first time step S626 is performed the blockchain node 104 retrieves the first 512 bit message block RealContent$_1$.

At step S1018, the blockchain node 104 uses the mask bit string, Mask$_i$, to determine whether sensitive bits are present in the message block RealContent$_i$.

If the message block RealContent$_i$ does not comprise sensitive bits then the process 1050 proceeds to step S1020 where the recipient blockchain node 104 retrieves an input hash value. It will be appreciated that the first time step S1020 is performed the blockchain node 104 retrieves a predetermined public initialization vector which will be from the Secure Hash Standard (SHS) in embodiments when the SHA256 hashing algorithm is used. For the subsequent times step S1020 is performed the blockchain node 104 retrieves the previous output hash value i.e. Hashvalue$_{i-1}$.

At step S1022, the blockchain node 104 computes a hash value, Hashvalue$_i$, by hashing the message block RealContent$_i$, where Hashvalue$_i$=SHA256(RealContent$_i$). The input hash value retrieved at step S1020 is used in the compression performed at step S1022.

If the message block RealContent$_i$ comprises sensitive bits then the process 1050 proceeds to step S1024 where the recipient blockchain node 104 verifies the zero knowledge proof for RealContent$_i$ using:

the zero knowledge proof for RealContent;

the message block RealContent;

the output hash value, Hashvalue;

the input hash value for RealContent; (Hashvalue$_{i-1}$) i.e. the hashed output (digest) of the previous block an input hash value used in the compression of the modified message the mask bit string, Mask$_i$ In the example where the zero knowledge proof generated at step S640 is a zkSNARK proof, a verification key (retrieved from memory of the recipient blockchain node 104) is additionally used in the verification of the zkSNARK proof.

As noted above, step S1020 is preferably performed before step s1022 however steps 1020 and S1022 may be performed in any order.

If there are further message blocks to process (determined at step S1026) the process proceeds to step S1026 where the blockchain node 104 increments the value for i by one and then the process 1050 loops back to step S1016 where the blockchain node 104 retrieves the next RealContent$_i$.

If the recipient blockchain node successfully verifies each of the zero knowledge proofs, the recipient blockchain node 104 is able to verify that the modified blockchain transaction RealContentPublic is valid.

In scenarios whereby multiple message blocks have sensitive data, whilst FIG. 10b show an iterative process, in some embodiments the proof verification process is performed in parallel. As noted above, for each message block Rea/Content$_i$ comprising sensitive bits, the recipient blockchain node 104 has the zero knowledge proof for that message block and the output hash value, Hashvalue$_i$ for that message block. The blockchain node 104 can compute the remaining hash values, Hashvalue$_i$, for blocks that do not comprise sensitive data by hashing the message block using an input hash value which corresponds to the hashed output (digest) of the previous block (or a predetermined initialization vector X$_0$ as discussed above in the case of the first message block). Once all of the hash values, Hashvalue$_i$, have been computed, the verification of each of the zero knowledge proofs associated with message blocks comprising sensitive data performed at step S1024 can be executed in parallel. With this parallel execution, N zero knowledge proofs can be verified in the same amount of time as it takes to verify a single zero knowledge proof, assuming there are sufficient computing resources.

FIG. 7 illustrates an example where RealContentPad has a length of 3072 and is split into six message blocks RealContent$_1$-RealContent$_6$. In the example shown in FIG. 7 message blocks RealContent$_4$ and RealContent$_5$ comprise sensitive bits 704.

By implementing the process 600, each message block comprising public data RealContent$_1$-RealContent$_3$ is hashed to generate a respective output hash value, however as they contain only public data, a zero knowledge proof is not generated for message blocks Rea/Content$_1$-RealContent$_3$.

The message block RealContent$_4$ comprises sensitive data and thus the blockchain node 104 will generates a zero knowledge proof for RealContent$_4$ using:

the public bit string, PublicData$_4$ the mask bit string, Mask$_4$ the output hash value, Hashvalue$_4$ (computed using the digest Hashvalue$_3$ of the compression of message block RealContent$_3$ as the input hash value)

the secret bit string SecretData$_4$; and the proving key retrieved from memory of the blockchain node 104 (if the zero knowledge proof uses a trusted setup like in a zkSNARK proof).

The message block RealContent$_5$ comprises sensitive data and thus the blockchain node 104 will generates a zero knowledge proof for RealContent$_5$ using:

the public bit string, PublicData$_5$ the mask bit string, Mask$_5$ the output hash value, Hashvalue$_5$ (computed using the digest Hashvalue$_4$ of the compression of message block RealContent$_4$ as the input hash value)

the secret bit string SecretData$_5$; and the proving key retrieved from memory of the blockchain node 104 (if the zero knowledge proof uses a trusted setup like in a zkSNARK proof).

At the end of the process 600, the sensitive bits 704 will have been removed from RealContentPad to generate a modified blockchain transaction RealContentPublic.

The modified blockchain transaction RealContentPublic is then output to a recipient. For example, the modified blockchain transaction RealContentPublic may be sent to a recipient blockchain node 104 in the blockchain network 106.

To enable the recipient blockchain node 104 to prove that the modified blockchain transaction RealContentPublic is valid, the blockchain node 104 additionally sends:

the zero knowledge proof generated for RealContent$_4$ the output hash value, Hashvalue$_4$ the zero knowledge proof generated for RealContent$_5$ the output hash value, Hashvalue$_5$ If the mask bit string, Mask$_4$, is publicly known then there is no need for the blockchain node 104 to send the mask bit string, Mask$_4$, to the recipient blockchain node 104. However, if the mask bit string, Mask$_4$, is not publicly known then the blockchain node 104 will additionally send the mask bit string, Mask$_4$, to the recipient blockchain node 104. Similarly, if the mask bit string, Mask$_5$, is publicly known then there is no need for the blockchain node 104 to send the mask bit string, Mask$_5$, to the recipient blockchain node 104. However, if the mask bit string, Mask$_5$, is not publicly known then the blockchain node 104 will additionally send the mask bit string, Mask$_5$, to the recipient blockchain node 104.

In order to verify that the modified blockchain transaction RealContentPublic is valid the recipient blockchain node 104 uses a predetermined public initialization vector $X_0$, which will be from the Secure Hash Standard (SHS) in embodiments when the SHA256 hashing algorithm is used, in the compression of the first message block, $RealContent_1$. The digest, $Hashvalue_1$ of the first compression is used as the input hash value $X_1$ in the compression of the second message block, $RealContent_2$. The digest, $Hashvalue_2$ of the second compression is used as the input hash value $X_2$ in the compression of the third message block, $RealContent_3$.

The recipient blockchain node 104 verifies the zero knowledge proof for $RealContent_4$, using:

the zero knowledge proof for $RealContent_4$ the message block $RealContent_4$ of RealContentPad the output hash value, $Hashvalue_4$ the input hash value for $RealContent_4$ ($Hashvalue_3$) i.e. the hashed output (digest) of the previous block the mask bit string, $Mask_4$ the verification key retrieved from memory of the recipient blockchain node 104 (if the zero knowledge proof uses a trusted setup like in a zkSNARK proof).

The recipient blockchain node 104 verifies the zero knowledge proof for $RealContent_5$, using:

the zero knowledge proof for $RealContent_5$ the message block $RealContent_5$ of RealContentPad the output hash value, $Hashvalue_5$ the input hash value for $RealContent_5$ ($Hashvalue_4$) i.e. the hashed output (digest) of the previous block the mask bit string, $Mask_5$ the verification key retrieved from memory of the recipient blockchain node 104 (if the zero knowledge proof is a zkSNARK proof).

In this example, because the final message block $RealContent_6$ does not comprise sensitive data, the recipient blockchain node 104 is able to compute a SHA256 hash of the final message block $RealContent_6$ (using the output hash value, $Hashvalue_5$ associated with the fifth message block $RealContent_5$ as the input hash value) to generate the output hash value $Hashvalue_6$.

The recipient blockchain node 104 then computes a SHA256 hash of $Hashvalue_6$, to check that SHA256 ($Hashvalue_6$) is equal to the public transaction ID associated with the modified blockchain transaction RealContentPublic.

Whilst FIGS. 6c and 6d show the generation of a zero knowledge proof for each message block comprising sensitive data. In other embodiments, adjacent message blocks of RealContentPad comprising sensitive data can be merged and a single zero knowledge proof is generated for the merged block.

Referring back to the example shown in FIG. 7 where RealContentPad has a length of 3072 and is split into six message blocks $RealContent_1$-$RealContent_6$, and message blocks $RealContent_4$ and $RealContent_5$ comprise sensitive bits 704, in these other embodiments the blockchain node 104 will generate a merged block of 1024 bits by concatenating $RealContent_4$ and $RealContent_5$ i.e. $RealContent_{merged}=RealContent_4\|RealContent_5$ In these other embodiments the blockchain node 104 will generate a zero knowledge proof for the merged block using:

a public bit string, $PublicData_{merged}$, computed by modifying $RealContent_{merged}$ by assigning the sensitive bit(s) with a zero value and retaining the public bit values. In this example PublicData has a length of 1024 bits.

a mask bit string, $Mask_{merged}$, which identifies the locations of the sensitive bit(s) in the merged block $RealContent_{merged}$. In this example $Mask_{merged}$ has a length of 1024 bits because $Mask_{merged}=Mask_4\|Mask_5$ (concatinated).

the hash value of the end message block in the merged block $RealContent_{merged}$, in this example, the output hash value, $Hashvalue_5$ (computed using the digest $Hashvalue_4$ of the compression of message block $RealContent_4$ as the input hash value) wherein the end message block is a portion of the merged block, $RealContent_{merged}$.

a secret b it string $SecretData_{merged}$, which includes the sensitive bit(s) of the merged block $RealContent_{merged}$. The blockchain node 104 will compute the secret bit string, $SecretData_{merged}$, by taking $RealContent_{merged}$ and retaining the sensitive bit(s) included therein, wherein the remaining bits of $SecretData_{merged}$ can take any value. secret bit string $SecretData_{merged}$ satisfies the requirement that:

$RealContent_{merged}=PublicData_{merged}$ XOR ($SecretData_{merged}$ AND $Mask_{merged}$).

In this example $SecretData_{merged}$ has a length of 1024 bits.

the proving key retrieved from memory of the blockchain node 104 (if the zero knowledge proof uses a trusted setup like in a zkSNARK proof).

The recipient blockchain node 104 verifies the zero knowledge proof for $RealContent_{merged}$ using:

the zero knowledge proof for $RealContent_{merged}$ the merged block $RealContent_{merged}$ the input hash value for the merged block $RealContent_{merged}$ which in this example is $Hashvalue_3$ the output hash value, $Hashvalue_5$ the mask bit string, $Mask_{merged}$ the verification key retrieved from memory of the recipient blockchain node 104 (if the zero knowledge proof uses a trusted setup like in a zkSNARK proof).

The recipient blockchain node 104 will know the hash output of hashing the third message block $RealContent_3$ and use this as an input hash value to $RealContent_{merged}$. The hash of $RealContent_{merged}$ which is $Hashvalue_5$ is used as the input hash value for the compression of the $6^{th}$ message block, $RealContent_6$.

The above technique of merging adjacent blocks can be used when a message block $RealContent_i$ does not have sufficient entropy and thus may be subject to a brute force attack by a malicious party to obtain the sensitive bit(s) present in the message block $RealContent_i$. A message block $RealConten_i$ may be regarded as not having sufficient entropy if the number of sensitive bits in the message block $RealContent_i$ is less than a predetermined threshold. The predetermined threshold may be the collision resistance security level associated with the hashing function used in embodiments of the present disclosure. For example the collision resistance security level associated with SHA256 hashing function is 128 bits. This means it will take a maximum of $2^{128}$ to break the system with a brute-force attack.

Thus in embodiments of the present disclosure the blockchain node 104 may be configured to identify that a message block comprising sensitive data comprises a number of sensitive bits that is less than a predetermined threshold, and merge the message block with at least one adjacent message block that comprises sensitive data to generate the merged block $RealContent_{merged}$. This merging can be implemented such that the number of sensitive bits in the merged block $RealContent_{merged}$ exceeds the predetermined threshold.

For example, if the 512 bit message block $RealContent_4$ included 56 sensitive bits, and the 512 bit message block RealContent$_5$ included 100 sensitive bits, the Real Content$_{merged}$ would comprise 156 sensitive bits exceeding the 128 bit collision resistance security level associated with SHA256 hashing function.

The computational cost incurred for generating a single zero knowledge proof for a merged block (generated by concatenating two message blocks) is the same as the computational cost incurred for generating a zero knowledge proof for each of the two message blocks, however the time taken to generate the single zero knowledge proof would take twice as long. This is because the generating a zero knowledge proof for each of the two message blocks can be computed in parallel, i.e. each block can be computed independently, because we have all the inputs we need including all the midstate (hashvalues) from the original content.

In addition, the blockchain node 104 may be configured to identify that a message block comprising sensitive data comprises a number of sensitive bits that is less than a predetermined threshold, and designate one or more of the public bits as sensitive bits to increase the entropy.

As noted above the message may be blockchain transaction which is received by a computing device.

In one example implementation, the computing device is a blockchain node 104. The blockchain node 104 may receive the blockchain transaction from a computer terminal 102 of a user of the blockchain network 106. The computer terminal 102 requesting that the blockchain transaction be propagated and recorded on the blockchain. The blockchain node 104 may perform the methods described herein to remove sensitive data from the blockchain transaction, before propagating the modified blockchain transaction with the information necessary to validate the modified blockchain transaction to other blockchain nodes 104 in the network 106.

In another example implementation, the computing device is a blockchain node 104. The blockchain node 104 may receive the blockchain transaction from a computer terminal 102 of a user of the blockchain network 106 or another blockchain node 104, whereby the transaction is to be recorded on the blockchain. Before adding the received transaction to the mempool, the blockchain node 104 may perform the methods described herein to remove sensitive data from the blockchain transaction. The modified blockchain transaction is then added to the mempool. If the blockchain node 104 identifies a valid proof-of-work solution, a new blockchain block 151 is generated by the blockchain node 104 which comprises the modified blockchain transaction. The new block 151 is then propagated to other nodes of the network with the information necessary to validate the correctness of the modified blockchain transaction, thus enabling each node to record the new block 151 on the blockchain.

In another example implementation, the computing device may receive a block 151 that has been recorded on the blockchain from another blockchain node 104, the block comprising the transaction.

The computing device may be a blockchain node 104. In response to receiving the block 151, the blockchain node 104 may perform the methods described herein to remove sensitive data from the blockchain transaction. The block 151 comprising the modified blockchain transaction is then sent to other nodes of the network with the information necessary to validate the modified blockchain transaction, thus enabling each node to record the new block 151 on the blockchain. Alternatively, the blockchain node 104 sends the block 151 comprising the modified blockchain transaction and the information necessary to validate the modified blockchain transaction to a recipient blockchain node 104 in response to receiving a request for the block 151 from the recipient blockchain node 104. For example, the recipient blockchain node 104 may be a new miner that has entered the bitcoin network who must download the entire blockchain and validate every transaction to construct the UTXO set.

In a variant of the above, in response to receiving the block 151, the blockchain node 104 may store the block in memory. In response to receiving a request for the block from a recipient blockchain node 104, the blockchain node 104 may perform the methods described herein to remove sensitive data from the blockchain transaction. The block comprising the modified blockchain transaction is then sent to other nodes of the network with the information necessary to validate the modified blockchain transaction. For example, the recipient blockchain node 104 may be a new miner that has entered the bitcoin network who must download the entire blockchain and validate every transaction to construct the UTXO set.

In another example implementation, the computing device is not a blockchain node 104 on the blockchain network 106 (i.e. is not an active node on the blockchain network 106). That is, the computing device is external to the blockchain network 106. The computing device may however be coupled to the blockchain network 106. The computing device maintains a copy of the blockchain 150 and serves blockchain data (e.g. blocks 151 recorded on the blockchain 150) to client devices 102. The computing device may receive blocks recorded on the blockchain 150 from one or more of the blockchain nodes 104. In response to receiving the block, the computing device may perform the methods described herein to remove sensitive data from the blockchain transaction. The block comprising the modified blockchain transaction is then sent to a client device with the information necessary to validate the modified blockchain transaction. Alternatively, the computing device sends the block comprising the modified blockchain transaction and the information necessary to validate the modified blockchain transaction to a client device in response to receiving a request for the block from the client device. In a variant of this, in response to receiving the block, the computing device may store the block in memory. In response to receiving a request for the block from a client device, the computing device may then perform the methods described herein to remove sensitive data from the blockchain transaction. The block comprising the modified blockchain transaction is then sent to a client device with the information necessary to validate the modified blockchain transaction.

We refer above to an example where the computing device may obtain a mask bit string by retrieving the mask bit string from memory of the computing device. This may be possible if a government entity or regulation entity identifies that a transaction of a block that has already been recorded on the blockchain comprises sensitive (e.g., illegal) data. In this scenario, the government/regulation entity can publish the transaction ID and mask bit string to computing devices e.g. blockchain nodes 104 of the network 106.

Whilst embodiments have been described herein with reference to the message being a blockchain transaction, embodiments of the present disclosure extend outside the context of bitcoin and other blockchains and may be used to block any part of a hash preimage.

As one example, the message may be passport information of a person. That is, in the example shown in FIG. 7 where RealContentPad has a length of 3072 and is split into six message blocks RealContent$_5$-RealContent$_6$, each of the message blocks may comprise respective identity attributes of the person (e.g., name, date of birth, place of birth, passport number, issue date, expiry date)

In this example, message blocks RealContent$_1$-RealContent$_6$ may be stored on an e-passport together with a signature of a government to the hashvalue Hashvalue$_6$ of the end message block RealContent$_6$. The e-passport may be in the form of a physical passport document that comprises an embedded integrated circuit (e.g., computing device) for the storage and processing of data. That is the embedded integrated circuit on the physical passport document may be configured to perform embodiments of the present disclosure.

Alternatively, the e-passport may be in the form of an electronic passport document that is stored in memory of a computing device (e.g., a mobile phone). This can be a virtual mobile identity which could be derived from an already issued government credential, such as an e-Passport. This e-Passport can securely be loaded onto a mobile device, such as a phone or a token.

If message blocks RealContent$_4$ and RealContent$_5$ comprise sensitive bits, the computing device may perform the methods described herein to remove sensitive data from a copy of the passport information to generate modified passport information which only includes selected attributes of the original passport information. The modified passport information is then output to a recipient with the information necessary to validate the modified passport information. For example, the computing device may send the modified passport information with the information necessary to validate the modified passport information to a remote device (e.g. an airport computer terminal). In another example, the computing device may output the modified passport information and the information necessary to validate the modified passport information on a display of the computing device so that it is visible to the recipient who can then verify the displayed information.

Once the modified message (e.g. modified passport information) is generated, the original message (the passport information of a person) is not removed from memory as it will be required at later times for verification with other entities.

To enable the remote device to prove that the modified passport information is valid, the computing device additionally sends, for each RealContent$_i$ comprising sensitive bits:

the zero knowledge proof the output hash value, Hashvalue;

If the mask bit string, Mask$_i$, is publicly known then there is no need for the computing device 104 to send the mask bit string, Mask$_i$, to the remote device. However, if the mask bit string, Mask$_i$, is not publicly known then the computing device will additionally send the mask bit string, Mask$_i$, to the remote device.

The remote device is able to use the process 1050 to verify that the modified passport information is valid by:

1) obtaining a hash value Hashvalue$_t$ of the final message block RealContent$_t$ of RealContentPad and comparing the obtained hash value Hashvalue$_t$ to a trusted hash value prestored in memory of the remote device to check that Hashvalue$_t$ is equal to the trusted hash value prestored in memory of the remote device. In this example, Hashvalue$_t$ corresponds to the hashvalue Hashvalue$_6$ of the end message block RealContent$_6$. Thus in contrast to the bitcoin scenario (described above with reference to step S1010) where it is the transaction ID that is the trusted value, in the context of passport information the trusted value is the trusted hash value prestored in the memory of the remote device.

As explained above, if the final message block RealContent$_t$ comprises sensitive bits then the computing device will send the Hashvalue$_t$ to the remote device. If the final message block RealContent$_t$ does not comprise sensitive bits then it is not necessary for the computing device to send the Hashvalue$_t$ to the remote device because the remote device will be able to obtain Hashvalue$_t$ from the verification process it performs.

2) verifying the zero knowledge proof for each RealContent$_i$, using:

the zero knowledge proof for RealContent$_i$

RealContent$_i$ the output hash value, Hashvalue$_i$ the initialisation vector for RealContent$_i$ (Hashvalue$_{i-1}$)

the mask bit string, Mask$_i$ a verification key retrieved from memory of the remote device (if the zero knowledge proof is a zkSNARK proof.

Other examples are possible. For example embodiments of the present disclosure would enable the selective disclosure of some information stored on a driving license (e.g. to prove that a person is over 18 years old) without having to disclose other information such as a personal residential address and/or hand written signature. The driving license may be a physical document or card, or stored electronically in memory of a computing device In another example, embodiments of the present disclosure would enable the selective disclosure of some information stored on an ID card to prove that a person is a resident of London without disclosing any other information. The ID card may be a physical object or stored electronically in memory of a computing device Embodiments of the present disclosure enable flexibility for a person to generate different masks to enable them to selectively disclose different portions of information of the same data to different entities at different times.

CONCLUSION

Other variants or use cases of the disclosed techniques may become apparent to the person skilled in the art once given the disclosure herein. The scope of the disclosure is not limited by the described embodiments but only by the accompanying claims.

For instance, whilst embodiments have been described above with reference to the SHA256 hashing function (also referred to herein as hashing algorithm), embodiments of the present disclosure can utilise any hashing function. As mere examples, other types of hash functions such as Pedersen or MiMC hash functions may be used.

Furthermore, embodiments of the present disclosure are not limited to using a particular type of zero knowledge proof. As a mere example the zero knowledge proof may utilize the algorithm set out in the paper by Jens Groth entitled "On the size of pairing-based non-interactive arguments. In Advances in Cryptology"—EUROCRYPT 2016-35th Annual International Conference on the Theory and Applications of Cryptographic Techniques, Vienna, Austria, May 8-12, 2016, Proceedings, Part II, pages 305-326, 2016.

Whilst the removal of sensitive bit(s) from RealContent-Pad at steps S620 and S642 have been described with reference to assigning all of the sensitive bit(s) with the same predetermined value (e.g. a zero) and retaining the public bit values of RealContentPad, in other embodiments these steps may comprise the complete removal of the location of sensitive bit(s) from RealContentPad such that this modified version of RealContentPad only comprises public bits. The message string of the modified version of RealContentPad is then output to a recipient. For example, the modified version of RealContentPad may be sent to a recipient blockchain node 104 in the blockchain network 106. Thus, in these examples the recipient blockchain node 104 does not receive the modified blockchain transaction RealContentPublic from the sender blockchain node 104 (which performed the process 600) but can reconstruct the modified blockchain transaction RealContentPublic (in which all of the sensitive bit(s) are assigned with the same predetermined value) using the modified version of RealContentPad and the mask bit string, Mask.

Some embodiments above have been described in terms of a bitcoin network 106, bitcoin blockchain 150 and bitcoin nodes 104. However, it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Aspects of the present disclosure are defined below with reference to the following clauses:

1. A method for blocking sensitive data in a message, the method performed on a computing device and comprising:

creating a copy of said message;

generating at least one zero knowledge proof, the generating of each of said at least one zero knowledge proof comprising:

obtaining a mask bit string which identifies locations of at least one sensitive bit in bits of said copy;

computing a public bit string by modifying said bits of said copy by assigning the at least one sensitive bit with a predetermined value;

determining a secret bit string which includes said at least one sensitive bit and satisfies a requirement that said bits of said copy are equal to an output of a bitwise logical calculation using the public bit string, the mask bit string and the secret bit string;

hashing the copy of said message or a portion thereof to generate an output hash value; and generating a zero knowledge proof using the public bit string, the mask bit string, the output hash value, the secret bit string;

removing each of said at least one sensitive bit from said copy to generate a modified message; and outputting the modified message to a recipient together with the at least one output hash value, and the at least one zero knowledge proof to enable the recipient to prove that the modified message is valid.

2. The method according to clause 1, further comprising:

prior to generating at least one zero knowledge proof, padding the copy of said message such that said copy has a length which is a positive integer multiple of an input message size defined by a hashing function used in said hashing; and if the length of said copy corresponds to the input message size defined by the hashing function, a single zero knowledge proof is generated by hashing the copy of said message to generate the output hash value using a public initialization vector.

3. The method according to clause 1, further comprising, prior to generating at least one zero knowledge proof, padding the copy of said message such that said copy has a length which is a positive integer multiple of an input message size defined by a hashing function used in said hashing; and if the length of said copy after said padding is greater than the input message size defined by the hashing function, the method comprising:

splitting the copy of said message into a plurality of message blocks each having a length which corresponds to the input message size defined by the hashing function;

identifying one or more message blocks that comprise sensitive data;

wherein a zero knowledge proof is generated for each of the one or more message blocks that comprise sensitive data.

4. The method according to clause 3, wherein for one or more of the at least one zero knowledge proof, the bits of said copy corresponds to bits of a message block of said one or more message blocks, and the zero knowledge proof is generated by hashing the message block to generate the output hash value.

5. The method according to clause 4, wherein said plurality of message blocks comprises a first message block and one or more further message blocks, and if the first message block comprises sensitive data the hashing of the first message block uses a public initialization vector, and if a further message block comprises sensitive data the hashing of the further message block uses a hash value output from hashing a message block immediately preceding said further message block.

6. The method according to any of clauses 3 to 5, wherein multiple message blocks of said plurality of message blocks comprise sensitive data, the method comprising generating a zero knowledge proof for each of the multiple message blocks in parallel.

7. The method according to any of clauses 3 to 6, wherein for one of the at least one zero knowledge proof, the bits of said copy corresponds to bits of a merged block, the merged block comprising a plurality of adjacent message blocks that each comprise sensitive data, and the zero knowledge proof is generated by iteratively hashing each of the messages blocks in the merged block and the output hash value is generated by hashing an end message block in the merged block using a hash value output from hashing a message block of said plurality of adjacent message blocks immediately preceding the end message block.

8. The method according to clause 7, further comprising identifying that a message block that comprises sensitive data comprises a number of sensitive bits that is less than a predetermined threshold; merging the message block with at least one adjacent message block that comprises sensitive data to generate the merged block;

9. The method according to clause 8, wherein the predetermined threshold is defined by the collision resistance of the hashing function.

10. The method according to any preceding clause, wherein the secret bit string satisfies a requirement that that said bits of said copy are equal to a bitwise XOR calculation of (i) the public bit string and (ii) a result of a bitwise AND calculation of the mask bit string and the secret bit string.

11. The method according to any preceding clause, wherein obtaining the mask bit string comprises retrieving the mask bit string from memory.

12. The method according to any of clauses 1 to 10, wherein obtaining the mask bit string comprises: identifying locations of at least one sensitive bit in the bits of the copy of said message; and generating the mask bit string which identifies said locations of the at least one sensitive bit in said copy.

13. The method according to any preceding clause, further comprising outputting the at least one mask bit string to the recipient.

14. The method according to any preceding clause, wherein said outputting comprises sending the modified message to a remote device associated with the recipient together with the at least one output hash value, the at least one public bit string, and the at least one zero knowledge proof.

15. The method according to clause 13, wherein the message comprises blockchain transaction data, and the modified message comprises modified blockchain transaction data.

16. The method according to clause 14, wherein the computing device is a blockchain node in a blockchain network.

17. The method according to clause 16, wherein the blockchain transaction data is received from a client device requesting that the blockchain transaction be recorded on a blockchain, and the remote device is a further blockchain node in the blockchain network, wherein the modified blockchain transaction data is sent to the further blockchain node for propagation in the blockchain network.

18. The method according to clause 16, wherein the remote device is a further blockchain node in the blockchain network, the method comprising: receiving the blockchain transaction; generating a block to be recorded on a blockchain, said block comprising the modified blockchain transaction data; and sending the block comprising the modified blockchain transaction data to the further blockchain node in the blockchain network.

19. The method according to clause 15, wherein the computing device is external to a blockchain network and the remote device is a client device.

20. The method according to clause 16 or 19, the method comprising receiving a block recorded on a blockchain, said block comprising the blockchain transaction data.

21. The method according to clause 20, wherein said generating, removing, and sending is performed in response to receiving said block.

22. The method according to clause 20, wherein said generating and removing is performed in response to receiving said block, and said sending is performed in response to receiving a request from said remote device for said block.

23. The method according to clause 20, wherein said generating, removing, and sending is performed in response to receiving a request from said remote device for said block.

24. The method according to any preceding clause, wherein the at least one zero knowledge proof is a zkSNARK (Zero-Knowledge Succinct Non-Interactive Argument of Knowledge) proof.

25. The method according to clause 24, wherein said generating the zero knowledge proof further comprising using a proving key.

26. The method according to any preceding clause, further comprising, after the generation of the modified message, removing the message from memory and storing the modified message in memory.

27. A computer program product embodied on computer-readable storage, comprising instructions configured so as when run on the computer equipment to perform the method of any preceding clause.

28. Computer equipment comprising a processor and memory, the memory storing instructions which, when executed by the processor cause the computer equipment to perform the method of any of clauses 1 to 26.

29. A method for verifying that a modified message is valid, the modified message corresponding to an original message with sensitive data removed therefrom, the method performed on a computing device and comprising: obtaining the modified message, wherein the modified message corresponds to said original message with each sensitive bit of the original message having been assigned a predetermined value; obtaining an output hash value of the modified message, and verifying the output hash value using data stored in memory of the computing device; receiving from a sender device at least one zero knowledge proof associated with bits of said modified message; verifying each of the at least one zero knowledge proofs using (i) knowledge of a bitwise logical calculation, or a verification key associated therewith, used by the sender device to derive a secret bit string used to generate said zero knowledge proof; (ii) the bits of said modified message; (iii) a mask bit string which identifies locations of at least one sensitive bit in the bits of said modified message; (iv) a hash value of the bits of said modified message or a portion thereof; and (v) an input hash value for the bits of said modified message.

30. The method of clause 29, wherein obtaining the modified message comprises receiving the modified message from the sender device.

31. The method of clause 29, wherein obtaining the modified message comprises:

receiving a version of the original message which only comprises public bits of the original message; and generating the modified message using the version of the original message and the mask bit string.

32. The method of any of clauses 29 to 31, wherein the bits of said modified message corresponds to the whole modified message, and the modified message has a length which corresponds to an input message size defined by a hashing function used to generate the output hash value of the modified message.

33. The method of any of clauses 29 to 31, wherein the modified message comprises a plurality of message blocks, the output hash value is a hash of an end message block of the plurality of message blocks, wherein the plurality of message blocks have a length which corresponds to an input message size defined by a hashing function used to generate the output hash value.

34. The method of clause 33, wherein the bits of said modified message corresponds to one of the plurality of message blocks.

35. The method of any of clauses 29 to 31, wherein the bits of said copy corresponds to bits of a merged block, the merged block comprising a plurality of adjacent message blocks that comprises sensitive data, and said verifying the zero knowledge proofs uses the hash value of an end message block of the merged block.

36. The method according to any of clauses 29 to 35, wherein the original message is a blockchain transaction and the data stored in memory of the computing device is a transaction identifier associated with said blockchain transaction, wherein verifying the output hash value comprises hashing the output hash value and comparing an output of said hashing to the transaction identifier.

37. The method according to any of clauses 29 to 36, wherein a plurality of zero knowledge proofs associated with bits of said modified message are received from the sender device, and verifying the plurality of zero knowledge proofs is performed in parallel.

38. A computer program product embodied on computer-readable storage, comprising instructions configured so as when run on the computer equipment to perform the method of any of clauses 29 to 37.

39. Computer equipment comprising a processor and memory, the memory storing instructions which, when executed by the processor cause the computer equipment to perform the method of any of clauses 29 to 37.

The invention claimed is:

1. A method for blocking sensitive data in a message, the method performed on a computing device and comprising:

creating a copy of said message;

generating at least one zero knowledge proof, the generating of each of said at least one zero knowledge proof comprising:

obtaining a mask bit string which identifies locations of at least one sensitive bit in bits of said copy;

computing a public bit string by modifying said bits of said copy by assigning the at least one sensitive bit with a predetermined value;

determining a secret bit string which includes said at least one sensitive bit and satisfies a requirement that said bits of said copy are equal to an output of a bitwise logical calculation using the public bit string, the mask bit string and the secret bit string;

hashing the copy of said message or a portion thereof to generate an output hash value; and generating a zero knowledge proof using the public bit string, the mask bit string, the output hash value, the secret bit string;

removing each of said at least one sensitive bit from said copy to generate a modified message; and outputting the modified message to a remote device associated with a recipient together with the at least one output hash value, the at least one public bit string, and the at least one zero knowledge proof to enable the recipient to prove that the modified message is valid, wherein the message comprises blockchain transaction data, and the modified message comprises modified blockchain transaction data.

2. The method according to claim 1, further comprising:

prior to generating at least one zero knowledge proof, padding the copy of said message such that said copy has a length which is a positive integer multiple of an input message size defined by a hashing function used in said hashing; and if the length of said copy corresponds to the input message size defined by the hashing function, a single zero knowledge proof is generated by hashing the copy of said message to generate the output hash value using a public initialization vector.

3. The method according to claim 1, further comprising, prior to generating at least one zero knowledge proof, padding the copy of said message such that said copy has a length which is a positive integer multiple of an input message size defined by a hashing function used in said hashing; and if the length of said copy after said padding is greater than the input message size defined by the hashing function, the method comprising:

splitting the copy of said message into a plurality of message blocks each having a length which corresponds to the input message size defined by the hashing function;

identifying one or more message blocks that comprise sensitive data;

wherein a zero knowledge proof is generated for each of the one or more message blocks that comprise sensitive data.

4. The method according to claim 3, wherein for one or more of the at least one zero knowledge proof, the bits of said copy corresponds to bits of a message block of said one or more message blocks, and the zero knowledge proof is generated by hashing the message block to generate the output hash value.

5. The method according to claim 4, wherein said plurality of message blocks comprises a first message block and one or more further message blocks, and if the first message block comprises sensitive data the hashing of the first message block uses a public initialization vector, and if a further message block comprises sensitive data the hashing of the further message block uses a hash value output from hashing a message block immediately preceding said further message block.

6. The method according to claim 3, wherein multiple message blocks of said plurality of message blocks comprise sensitive data, the method comprising generating a zero knowledge proof for each of the multiple message blocks in parallel.

7. The method according to claim 3, wherein for one of the at least one zero knowledge proof, the bits of said copy corresponds to bits of a merged block, the merged block comprising a plurality of adjacent message blocks that each comprise sensitive data, and the zero knowledge proof is generated by iteratively hashing each of the messages blocks in the merged block and the output hash value is generated by hashing an end message block in the merged block using a hash value output from hashing a message block of said plurality of adjacent message blocks immediately preceding the end message block.

8. The method according to claim 7, further comprising identifying that a message block that comprises sensitive data comprises a number of sensitive bits that is less than a predetermined threshold;

merging the message block with at least one adjacent message block that comprises sensitive data to generate the merged block.

9. The method according to claim 1, wherein the secret bit string satisfies a requirement that that said bits of said copy are equal to a bitwise XOR calculation of (i) the public bit string and (ii) a result of a bitwise AND calculation of the mask bit string and the secret bit string.

10. The method according to claim 1, wherein obtaining the mask bit string comprises retrieving the mask bit string from memory.

11. The method according to claim 1, wherein obtaining the mask bit string comprises:

identifying locations of at least one sensitive bit in the bits of the copy of said message; and generating the mask bit string which identifies said locations of the at least one sensitive bit in said copy.

12. The method according to claim 1, wherein the computing device is a blockchain node in a blockchain network.

13. The method according to claim 12, wherein the blockchain transaction data is received from a client device requesting that the blockchain transaction be recorded on a blockchain, and the remote device is a further blockchain node in the blockchain network, wherein the modified blockchain transaction data is sent to the further blockchain node for propagation in the blockchain network.

14. The method according to claim 12, wherein the remote device is a further blockchain node in the blockchain network, the method comprising:

receiving the blockchain transaction;

generating a block to be recorded on a blockchain, said block comprising the modified blockchain transaction data; and sending the block comprising the modified blockchain transaction data to the further blockchain node in the blockchain network.

15. The method according to claim 1, wherein the computing device is external to a blockchain network and the remote device is a client device.

16. The method according to claim 12, the method comprising receiving a block recorded on a blockchain, said block comprising the blockchain transaction data.

17. The method according to claim 16, wherein:

said generating, removing, and sending is performed in response to receiving said block;

said generating and removing is performed in response to receiving said block, and said sending is performed in response to receiving a request from said remote device for said block; or said generating, removing, and sending is performed in response to receiving a request from said remote device for said block.

18. A computer program product embodied on non-transitory computer-readable storage media comprising instructions configured so as when run on computer equipment, the computer equipment performs a method of blocking sensitive data in a message, comprising:

creating a copy of said message;

generating at least one zero knowledge proof, the generating of each of said at least one zero knowledge proof comprising:

obtaining a mask bit string which identifies locations of at least one sensitive bit in bits of said copy;

computing a public bit string by modifying said bits of said copy by assigning the at least one sensitive bit with a predetermined value;

determining a secret bit string which includes said at least one sensitive bit and satisfies a requirement that said bits of said copy are equal to an output of a bitwise logical calculation using the public bit string, the mask bit string and the secret bit string;

hashing the copy of said message or a portion thereof to generate an output hash value; and generating a zero knowledge proof using the public bit string, the mask bit string, the output hash value, the secret bit string;

removing each of said at least one sensitive bit from said copy to generate a modified message; and outputting the modified message to a remote device associated with a recipient together with the at least one output hash value, the at least one public bit string, and the at least one zero knowledge proof to enable the recipient to prove that the modified message is valid, wherein the message comprises blockchain transaction data, and the modified message comprises modified blockchain transaction data.

19. Computer equipment comprising a processor and memory, the memory storing instructions which, when executed by the processor, cause the computer equipment to perform a method of blocking sensitive data in a message, comprising:

creating a copy of said message;

generating at least one zero knowledge proof, the generating of each of said at least one zero knowledge proof comprising:

obtaining a mask bit string which identifies locations of at least one sensitive bit in bits of said copy;

computing a public bit string by modifying said bits of said copy by assigning the at least one sensitive bit with a predetermined value;

determining a secret bit string which includes said at least one sensitive bit and satisfies a requirement that said bits of said copy are equal to an output of a bitwise logical calculation using the public bit string, the mask bit string and the secret bit string;

hashing the copy of said message or a portion thereof to generate an output hash value; and generating a zero knowledge proof using the public bit string, the mask bit string, the output hash value, the secret bit string;

removing each of said at least one sensitive bit from said copy to generate a modified message; and outputting the modified message to a remote device associated with a recipient together with the at least one output hash value, the at least one public bit string, and the at least one zero knowledge proof to enable the recipient to prove that the modified message is valid, wherein the message comprises blockchain transaction data, and the modified message comprises modified blockchain transaction data.

20. A method for verifying that a modified message is valid, the modified message corresponding to an original message with sensitive data removed therefrom, the method performed on a computing device and comprising:

obtaining the modified message, wherein the modified message corresponds to said original message with each sensitive bit of the original message having been assigned a predetermined value;

obtaining an output hash value of the modified message, and verifying the output hash value using data stored in memory of the computing device;

receiving from a sender device at least one zero knowledge proof associated with bits of said modified message;

verifying each of the at least one zero knowledge proofs using (i) knowledge of a bitwise logical calculation, or a verification key associated therewith, used by the sender device to derive a secret bit string used to generate said zero knowledge proof; (ii) the bits of said modified message; (iii) a mask bit string which identifies locations of at least one sensitive bit in the bits of said modified message; (iv) a hash value of the bits of said modified message or a portion thereof; and (v) an input hash value for the bits of said modified message, wherein the original message is a blockchain transaction and the data stored in memory of the computing device is a transaction identifier associated with said blockchain transaction, wherein verifying the output hash value comprises hashing the output hash value and comparing an output of said hashing to the transaction identifier.

21. The method of claim 20, wherein obtaining the modified message comprises receiving the modified message from the sender device.

22. The method of claim 20, wherein obtaining the modified message comprises:

receiving a version of the original message which only comprises public bits of the original message; and generating the modified message using the version of the original message and the mask bit string.

23. The method of claim 20, wherein the bits of said modified message corresponds to the whole modified message, and the modified message has a length which corresponds to an input message size defined by a hashing function used to generate the output hash value of the modified message.

24. The method of claim 20, wherein the modified message comprises a plurality of message blocks, the output hash value is a hash of an end message block of the plurality of message blocks, wherein the plurality of message blocks have a length which corresponds to an input message size defined by a hashing function used to generate the output hash value.

25. The method of claim 24, wherein the bits of said modified message corresponds to one of the plurality of message blocks.

26. The method of claim 20, wherein the bits of said copy corresponds to bits of a merged block, the merged block comprising a plurality of adjacent message blocks that comprises sensitive data, and said verifying the zero knowledge proofs uses the hash value of an end message block of the merged block.

27. The method according to claim 20, wherein a plurality of zero knowledge proofs associated with bits of said modified message are received from the sender device, and verifying the plurality of zero knowledge proofs is performed in parallel.

28. A computer program product embodied on non-transitory computer-readable storage media comprising instructions configured so as when run on computer equipment, the computer equipment performs a method of verifying that a modified message is valid, the modified message corresponding to an original message with sensitive data removed therefrom, comprising:

obtaining the modified message, wherein the modified message corresponds to said original message with each sensitive bit of the original message having been assigned a predetermined value;

obtaining an output hash value of the modified message, and verifying the output hash value using data stored in memory of the computer equipment receiving from a sender device at least one zero knowledge proof associated with bits of said modified message;

verifying each of the at least one zero knowledge proofs using (i) knowledge of a bitwise logical calculation, or a verification key associated therewith, used by the sender device to derive a secret bit string used to generate said zero knowledge proof; (ii) the bits of said modified message; (iii) a mask bit string which identifies locations of at least one sensitive bit in the bits of said modified message; (iv) a hash value of the bits of said modified message or a portion thereof; and (v) an input hash value for the bits of said modified message, wherein the original message is a blockchain transaction and the data stored in memory of the computing device is a transaction identifier associated with said blockchain transaction, wherein verifying the output hash value comprises hashing the output hash value and comparing an output of said hashing to the transaction identifier.

29. Computer equipment comprising a processor and memory, the memory storing instructions which, when executed by the processor, cause the computer equipment to perform a method of verifying that a modified message is valid, the modified message corresponding to an original message with sensitive data removed therefrom, comprising:

obtaining the modified message, wherein the modified message corresponds to said original message with each sensitive bit of the original message having been assigned a predetermined value;

obtaining an output hash value of the modified message, and verifying the output hash value using data stored in memory of the computer equipment;

receiving from a sender device at least one zero knowledge proof associated with bits of said modified message;

verifying each of the at least one zero knowledge proofs using (i) knowledge of a bitwise logical calculation, or a verification key associated therewith, used by the sender device to derive a secret bit string used to generate said zero knowledge proof; (ii) the bits of said modified message; (iii) a mask bit string which identifies locations of at least one sensitive bit in the bits of said modified message; (iv) a hash value of the bits of said modified message or a portion thereof; and (v) an input hash value for the bits of said modified message, wherein the original message is a blockchain transaction and the data stored in memory of the computing device is a transaction identifier associated with said blockchain transaction, wherein verifying the output hash value comprises hashing the output hash value and comparing an output of said hashing to the transaction identifier.

* * * * *